United States Patent [19]
Lee et al.

[11] Patent Number: 5,574,895
[45] Date of Patent: Nov. 12, 1996

[54] MULTI-MEMORY FUNCTION PROGRAMMABLE COUNTER AND TIMER

[76] Inventors: Chang S. Lee; Ching T. Lee, both of 3321 Fay Ave., Culver City, Calif. 90232

[21] Appl. No.: 423,993

[22] Filed: Apr. 18, 1995

[51] Int. Cl.⁶ ................................................. G06F 1/14
[52] U.S. Cl. ................................................. 395/555
[58] Field of Search ................................................. 395/550

[56] References Cited

U.S. PATENT DOCUMENTS

| | | |
|---|---|---|
| 4,071,745 | 1/1978 | Hall . |
| 4,193,120 | 3/1980 | Yello . |
| 4,229,646 | 10/1980 | Burkhardt et al. . |
| 5,081,297 | 1/1992 | Lebel et al. . |
| 5,105,150 | 4/1992 | Liu . |
| 5,109,503 | 4/1992 | Cruickshank et al. . |
| 5,160,853 | 11/1992 | Simon et al. . |
| 5,267,159 | 11/1993 | O'Neall . |

FOREIGN PATENT DOCUMENTS 2425672  12/1979  France .

*Primary Examiner*—Thomas M. Heckler
*Attorney, Agent, or Firm*—Richard C. Litman

[57] ABSTRACT

A multi-memory function programmable counter or multi-memory function programmable timer capable of selectively assuming a plurality of counter or timer configurations. The main components of the present invention include a microprocessor, plurality of memory storage locations, and a keypad. Each of the plurality of memory storage locations stores a set of counter or timer function parameters and a preset count or time value, each of which defines a respective counter or timer configuration. The microprocessor includes a primary memory storage device for storing an operating system and a set of permissible values for a respective member of each set of the counter or timer function parameters. The keypad is coupled to the microprocessor to allow the user to select a value for each member of each set of counter or timer function parameters and for the preset count or time value. The value for each member of each set of counter or timer function parameters is selected from the set of permissible values. The keypad further allows the user to select one of the counter or timer configurations stored in a respective one of the plurality of memory storage locations. The microprocessor controls operation of the counter or timer in accordance with one of the counter or timer configurations selected by the user, such that the counter or timer is capable of readily assuming any one of the plurality of counter or timer configurations without the user having to reprogram the counter or timer.

19 Claims, 14 Drawing Sheets

MULTI-MEMORY FUNCTION PROGRAMMABLE COUNTER AND TIMER

BACKGROUND OF THE INVENTION

1. Field of the Invention

The present invention relates to high speed counters and timers.

2. Description of the Prior Art

Multi-function programmable counters and timers are widely used in today's industrial automatic control systems to perform a full range of counting and timing tasks. One advantage of such counters and timers is that a wide variety of user-selected function modes are offered in a single device. Thus, a single multi-function programmable counter or timer can be used to perform almost all the required counting or timing tasks for a specific industrial control environment. However, currently available counters and timers permit only one task to be programmed and executed at a time. Furthermore, the programming procedures for such devices are generally time consuming and complicated for ordinary operators to perform. For these reasons, there is a need for a multi-memory function, programmable counter and timer which provides multiple memory storage for multiple tasks and which is also easy to program and operate.

U.S. Pat. No. 4,071,745, issued to B. C. Hallon on Jan. 31, 1978, shows an electronic system and method for controlling a measured temperature during a sequence of time intervals, in accordance with a sequence of selected reference temperatures, each corresponding to one of the time intervals.

U.S. Pat. No. 4,193,120, issued to Joseph F. Yello on Mar. 11, 1980, shows an addressable event display and control system for use with a clock controlled programmable memory having the capability of storing a multitude of time regulated program events.

U.S. Pat. No. 4,229,646, issued to Horst Burkhardt et al. on Oct. 21, 1980, shows an electronic counter for an incremental measuring device. The counter includes an up-down counter, a plurality of memory units, and a computer. The computer is coupled with the counter and the memory units and is programmed to algebraically combine the value stored in the counter with the value stored in the designated memory unit to generate an output value for display.

U.S. Pat. No. 5,081,297, issued to Joseph A. Lebel et al. on Jan. 14, 1992, shows a reconfigurable signal processing device that includes a plurality of programmable modules that are reconfigurable to perform one of a plurality of selected signal processing functions. The modules may be reconfigured under software control to act as one of a time based generator, a counter, an accumulator, an address register, a delay circuit, and a timer.

U.S. Pat. No. 5,105,150, issued to Paul Liu on Apr. 14, 1992, shows a wide-band programmable tachometer and speedometer/odometer apparatus to detect the rotational speed of an output shaft of an engine.

U.S. Pat. No. 5,109,503, issued to Ancil B. Cruickshank et al. on Apr. 28, 1992, shows a reconfigurable counter having a memory for showing a plurality of user selectable counter profiles, each counter profile corresponding to a different counter configuration. The counter includes a selector, operatively coupled to the memory, for indicating a selected counter profile desired for the counter.

U.S. Pat. No. 5,160,853, issued to Tim Simon et al. on Nov. 3, 1992, shows a programmable timer for turning a light on and off in response to changing sunset, daylight savings time and other programmable conditions.

U.S. Pat. No. 5,267,159, issued to Donald L. O'Neall on Nov. 30, 1993, shows a milage recording and display apparatus for use in a vehicle allowing a user to record and display milage for multiple business activities and for personal activities. The apparatus employs a plurality of selectable memory banks each dedicated to a designated business or personal activity which the user selects upon vehicle start-up.

French Patent Application No. 2,425,672, filed by Guy Pastuzak and published on Dec. 7, 1979, shows a digitally programmed function generator for an industrial control system. The function generator uses a memory containing the characteristic values of the program being used, which is combined with a calculator for obtaining the actual value of each variable via interpolation techniques.

None of the above referenced patents and patent applications teach or suggest a programmable counter or timer providing a plurality of memory storage means for storing multiple user-selected sets of preprogrammed function parameters and preset values, each of which define a specific counter or timer configuration.

None of the above inventions and patents, taken either singly or in combination, is seen to describe the instant invention as claimed.

SUMMARY OF THE INVENTION

The present invention is directed to a multi-memory function programmable counter or multi-memory function programmable timer capable of selectively assuming a plurality of counter or timer configurations. The main components of the present invention include a microprocessor, plurality of memory storage means, input means, and selection means.

The plurality of memory storage means correspond in number to a plurality of counter or timer configurations. Each of the plurality of memory storage means stores a plurality of sets of counter or timer function parameters and a preset count or time value, each of which defines a respective counter or timer configuration.

The plurality of memory storage means communicates with the microprocessor through a bus. The microprocessor includes a primary memory means for storing the system operating program and a plurality of sets of permissible values. Each set of permissible values contains permissible values for a respective member of each set of the counter or timer function parameters. The system operating program stored in the microprocessor manages the entire function of the system such as counting in the counter and timing in the timer and programming the function parameters, the preset count or time value, and the message display. In operation, the microprocessor of the multi-memory function programmable counter or timer is operated to obtain a set of function parameters and a preset count or time value stored in the plurality of memory storage means and then to perform the selected configuration.

The input means is coupled to the microprocessor to allow the user to select a value for each member of each set of counter or timer function parameters and a preset count or time value. The value for each member of each set of counter or timer function parameters is selected from a respective one of the sets of permissible values. The user may also program a preset count or time value, for triggering an output signal, for each timer or counter configuration.

The selection means communicates with the microprocessor to allow the user to select one of the counter or timer configurations defined by a corresponding set of counter or timer function parameters and a preset count or time value stored in a respective one of the plurality of memory storage means. The microprocessor controls operation of the counter or timer in accordance with one of the counter or timer configurations selected by the user, such that the counter or timer is capable of readily assuming any one of the plurality of counter or timer configurations without the user having to reprogram the counter or timer.

Accordingly, it is a principal object of the invention to provide a multi-memory function programmable counter or multi-memory function programmable timer capable of selectively assuming a plurality of counter or timer configurations.

It is another object of the invention to provide a multi-memory function programmable counter or multi-memory function programmable timer having the memory capability for storing a plurality of user selected counter or timer configurations.

It is a further object of the invention to provide a multi-memory function programmable counter or multi-memory function programmable timer having a stored set of permissible values for each set of counter or timer function parameters and a preset count or time value which define a user selected counter or timer configuration.

Still another object of the invention is to provide a multi-memory function programmable counter or multi-memory function programmable timer capable of selectively assuming a plurality of counter or timer configurations and which is easy to program and operate.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
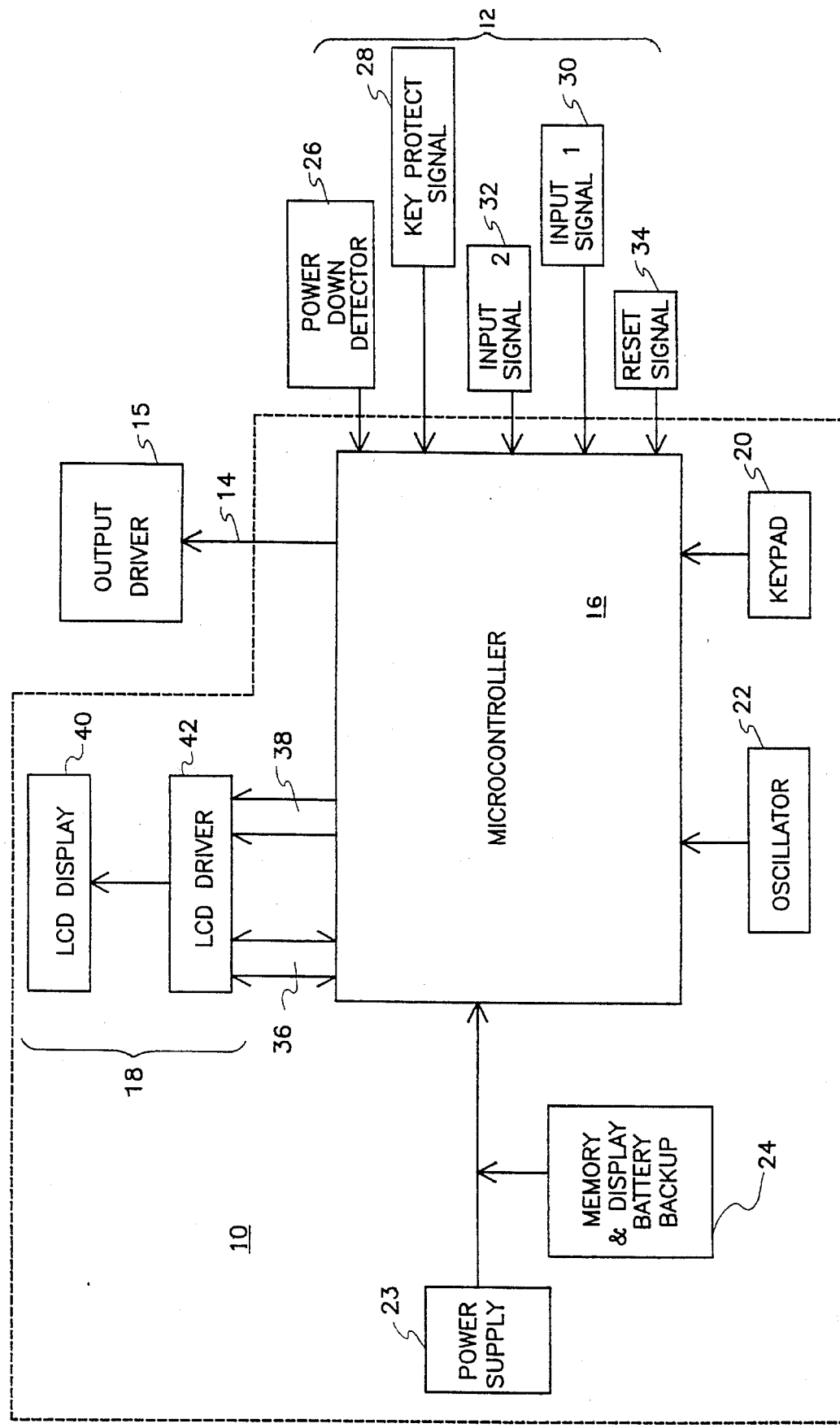
FIG. 1 is a block diagram of the present invention showing the relationship between the peripheral components and the microcontroller of the present invention.

A multi-memory function programmable counter or multi-memory function programmable timer 10 according to the present invention includes the functional blocks shown in FIG. 1. Multi-memory function programmable counter or multi-memory function programmable timer 10 communicates with a plurality of inputs 12 and at least one output signal 14. The main components of multi-memory function programmable counter or multi-memory function programmable timer 10 include a microcontroller 16, display means 18, a keypad 20, an oscillator 22, a power supply 23, and a memory and display battery backup 24.

Plurality of inputs 12 communicate with microcontroller 16 and includes the following input signals: a power down detector signal 26, a key protect signal 28, a first input signal 30, a second input signal 32, and a reset signal 34. Plurality of inputs 12 communicate the above described input signals to multi-memory function programmable counter or multi-memory function programmable timer 10 for producing output signal 14 usable by output driver 15 in controlling the desired industrial equipment. Output driver 15 controls externally connected devices within the industrial equipment, such as a solenoid or relay, in response to output signal 14, generated as a function of a particular count value or time value.

Display means 18 communicates with microcontroller 16 through an input and output control bus 36 and an output data bus 38. Display means 18 provides display data and display control information from multi-memory function programmable counter or multi-memory function programmable timer 10 to the user. Display data, such as counting or timing data, is transmitted to display means 18 via output data bus 38. Display control information, discussed below, is transmitted to and from display means 18 via input and output control bus 36.

Display means 18 includes an LCD display 40 and an LCD driver 42. The LCD driver employed in the present embodiment as LCD driver 42 is a Hitachi segment type LCD driver, model number HD61602. Alternative suitable designs for LCD driver 42 are well known to those skilled in the art. Alternatively, any well known display means may be used in conjunction with the present invention, including a LED type display or a CRT type display.

As is conventional, oscillator 22 is coupled to microcontroller 16 to provide a time base signal or system clock signal for microcontroller 16. Oscillator 22 operates at a frequency of 6 MHz, although those skilled in the art will appreciate that other oscillator frequencies may be used as well.

Power supply 23 supplies all the power required by the circuits and devices of multi-memory function programmable counter or multi-memory function programmable timer 10 and power is supplied at 5 volts and 12 volts, 12 volts being necessary to drive an internal relay to turn on or off external equipment. For the sake of brevity, the connections of power supply 23 to the remaining circuits and devices of multi-memory function programmable timer and multi-memory function programmable counter 10 are not shown. A suitable design for power supply 23 is well known to those skilled in the art. Memory and display battery backup 24 provides power to display means 18 and microcontroller 16 in the event of loss of power to multi-memory function programmable counter or multi-memory function programmable timer 10 from power supply 23.

TIMER EMBODIMENT

Figure 2:
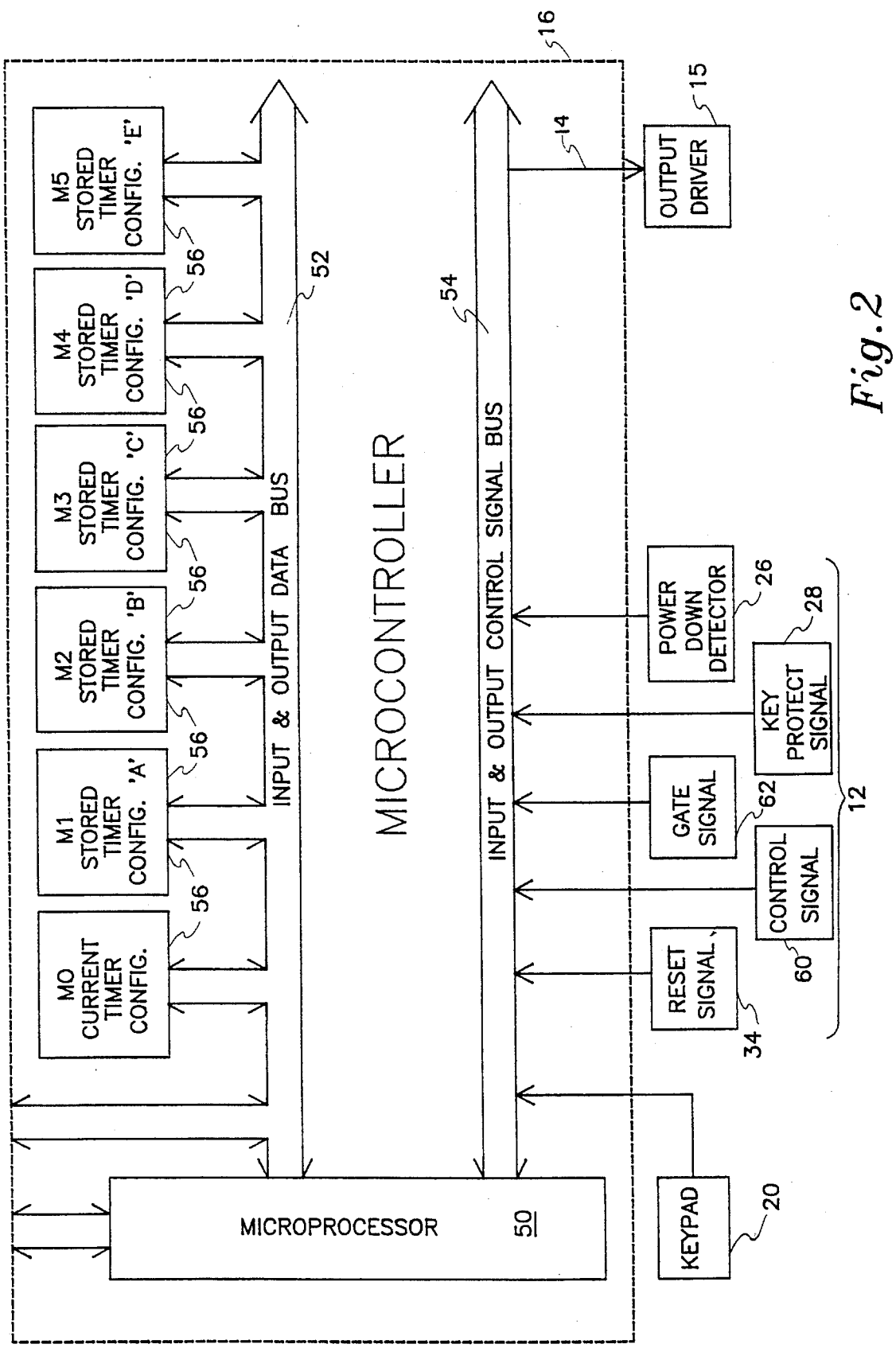
FIG. 2 is a block diagram of a first embodiment of the present invention, a multi-memory function programmable timer, showing the relationship between the major components of the microcontroller and the input and output signals of the multi-memory function programmable timer.

Referring to FIG. 2, the features of microcontroller 16 when used in a multi-memory function programmable timer in accordance with the present invention is shown. Microcontroller 16 includes a microprocessor 50, an input and output data bus 52, an input and output control signal bus 54, and a plurality of memory storage means 56.

Microprocessor 50 includes primary memory storage means (not shown) for storing a plurality of sets of permissible values for a plurality of sets of timer function parameters and for storing a multi-function programmable timer system operating program. In the present embodiment, the primary storage means is in the form of non-volatile flash programmable erasable read only memory (PEROM). Preferably, primary memory storage means is in the form of a non-volatile memory storage device. Alternatively, the primary memory storage means can be in the form of a volatile memory storage device or in the form of any other well known memory storage device, such as read only memory (ROM), programmable read only memory (PROM), erasable programmable read only memory (EPROM), dynamic random access memory (DRAM), and static random access memory (SRAM).

Plurality of memory storage means 56 includes six memory storage locations, M0–M5, for storing a plurality of timer configurations. Each timer configuration is defined by a set of timer function parameters and a preset time value chosen by the user, as described in more detail below. Plurality of memory storage means 56 is preferably a volatile memory storage memory device, but can be a non-volatile memory storage device. In the present embodiment, plurality of memory storage means 56 is in the form of RAM. Alternatively, plurality of memory storage means 56 may be in the form of DRAM or SRAM. Plurality of memory storage means 56 communicates with microprocessor 50 via input and output data bus 52.

The configuration of multi-memory function timer 10 can be chosen by the user by selecting a timer configuration from one of the memory storage locations of plurality of memory storage means 56. The system operating program stored in microprocessor 50 manages the entire function of multi-memory function timer 10, including programming of the function parameters and the preset time values and performing the timing operation in accordance with the selected timer configuration. A present time value is maintained internally to microcontroller 16 in one of its internal memory locations, such as a register.

Plurality of inputs 12, output driver 15, and keypad 20 communicate with microprocessor 50 via input and output control signal bus 54. First input signal 30 is a control signal 60 for signaling when timing by multi-memory function programmable timer 10 is to begin. Second input signal 32 is a gate signal 62 for temporarily suspending timing functions by multi-memory function programmable timer 10. Reset signal 34 clears the present timing value within multi-memory function programmable timer 10. Power down detector signal 26 signals microprocessor 50 that power to multi-memory function programmable timer 10 has been interrupted. Key protect signal 28 signals microprocessor 50 to ignore input from keypad 20 thereby preventing a user from using the keypad to program or operate multi-memory function programmable timer 10. Plurality of input signals 12 can be in the form of an external mechanical signal, such as from a toggle switch, or an external electric signal, such as a clock pulse.

Figure 4:
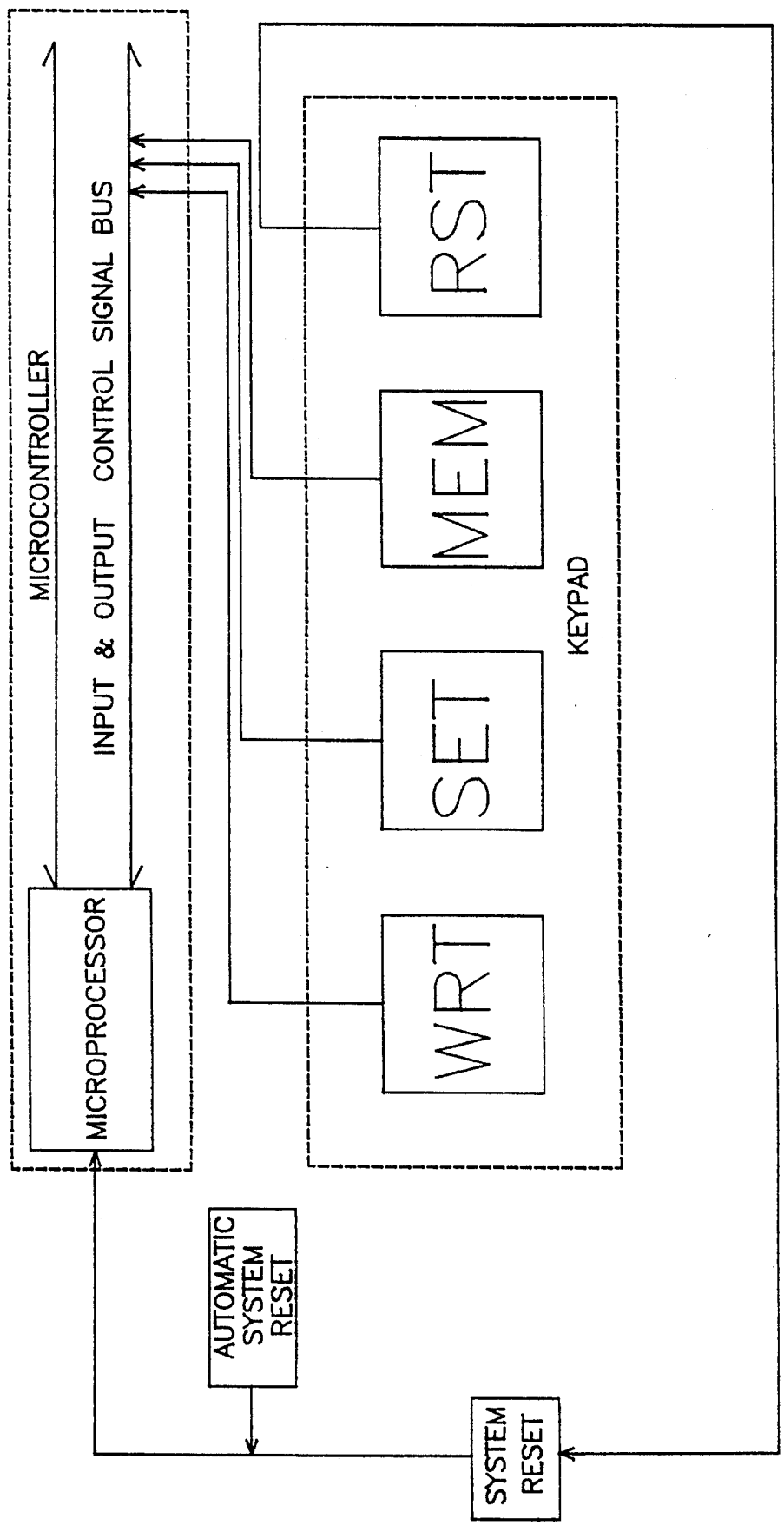
FIG. 4 is a block diagram of the present invention showing the relationship between the keypad and the microcontroller of the present invention.

Referring to FIG. 4, keypad 20 is shown in block diagram form. Keypad 20 includes a write key 80, a set key 82, a memory key 84, and a reset key 86. The function of the above referenced keys will be discussed later in the description of the operation and programming of multi-memory function programmable timer and multi-memory function programmable counter 10.

In operation, the primary memory storage means is pre-programmed with a set of permissible values for each of the timer function parameters selectable by the user to define a particular timer configuration. The timer function parameters include a time range, an up/down mode, an output mode, an output time, a key protect mode, and a memory storage position. One timer configuration is defined by the selection of one permissible value for each one of the timer function parameters. As a result, numerous timer configurations may be selected or programmed by the user for use with multi-memory function programmable timer 10.

When multi-memory function programmable timer 10 is turned on, i.e. power is supplied to multi-memory function programmable timer 10 from power supply 23, multi-memory function programmable timer 10 is in the run mode. In the run mode, multi-memory function programmable timer 10 will begin to operate, i.e. start timing, upon receipt of control signal 60 from a predetermined source. For example, when multi-memory function programmable timer 10 is part of a feedback control system, control signal 60 will be generated by the industrial equipment controlled by output driver 15. During the timing operation, the present time value is displayed by multi-memory function programmable timer 10 on display means 18.

User programming of a timer configuration is accomplished in the write function mode. Pressing write key 80 while in the run mode initiates the programming process. Further pressing of write key 80 in the write function mode allows the user to select between the timer function parameters. Pressing set key 82 in the write function mode allows the user to sequentially scan through the permissible values stored in the primary memory means, for the currently selected timer function parameter. Once the desired value is displayed, pressing write key 80 causes the displayed permissible value for the selected timer function parameter to be assigned to the selected timer function parameter, and immediately causes the next timer function parameter to be selected for the purpose of assigning a value thereto. After a complete set of timer function parameter values is selected by the user, pressing reset key 86 returns multi-memory function programmable timer 10 to the run mode. At this time, the set of selected timer function parameter values and the current preset time value, described below, is stored in memory storage location M0 as the current timer configuration or is stored in one of the memory storage locations, M1–M5, that was selected as part of the set of selected timer function parameter values. It should be noted that pressing reset key 86 at any time while in the write function mode returns multi-memory function programmable timer 10 to the run mode.

The time range parameter allows the user to program the unit of time in which the present time value is displayed by display means 18. For example, in the present embodiment, the user can select between thousandths of a second, hundredths of a second, tenths of a second, seconds, minutes and seconds, tenths of a minute, minutes, hours and minutes, tenths of an hour, and hours, for the time range parameter.

The up/down mode parameter allows the user to select between timing forward or timing backward.

The output time parameter allows the user to select the duration of output signal 14 to be generated by multi-memory function programmable timer 10. For example, in the present embodiment, the user can select between time periods of 0.1 seconds, 0.5 seconds, 1 second, 5 seconds, 10 seconds, 15 seconds, or 20 seconds. Also, the user may choose the hold setting, in which output signal 14 is maintained by multi-memory function programmable timer 10 until another signal, such as reset signal 34 or power down detector signal 26, is applied to multi-memory function programmable timer 10.

The output mode parameter allows the user to select between sixteen different output modes (modes A-H, L, N-P, S-T, U, Y), each corresponding to a different output signal generated during the timing operation by multi-memory function programmable timer 10 as a function of the present time value, a preset time value, control signal 60, gate signal 62, reset signal 34, and power down detector signal 26. The preset time value is selected by the user, as described below.

In output mode A, the signal on delay mode, the present time value is reset to the set point value in the down mode of counting or to zero in the up mode of counting by multi-memory function programmable timer 10 when power supply to the timer is resumed after any interruption. Timing begins at the leading edge of control signal 60 and, as timing continues, the present time value is increased or decreased depending on whether the up mode of counting or the down mode of counting is selected by the user. Control signal 60 is ignored by multi-memory function programmable timer 10 once timing begins. The present time value is suspended while gate signal 62 is applied to multi-memory function programmable timer 10. Multi-memory function programmable timer 10 generates output signal 14 when the present time value reaches the preset time value. Output signal 14 is maintained for the duration selected by the user (the output time parameter) or until reset signal 34 or power down detector signal 26 is applied to multi-memory function programmable timer 10.

In output mode B, the signal keep on delay mode, the present time value is reset to the set point value in the down mode of counting or to zero in the up mode of counting by multi-memory function programmable timer 10 when power supply to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. Multi-memory function programmable timer 10 generates output signal 14 if the duration of control signal 60 equals the preset time value. Output signal 14 is maintained for a duration selected by the user (the output time parameter) or until reset signal 34 or power down detector signal 26 is applied to multi-memory function programmable timer 10.

In output mode C, the power on delay with reset mode, the present time value is reset to the user defined set point value in the down mode of counting or to zero in the up mode of counting by multi-memory function programmable timer 10 when power to the timer is resumed after any interruption. Timing begins when power is supplied to multi-memory function programmable timer 10 and, as timing continues, the present time value is increased or decreased depending on whether the up mode of counting or the down mode of counting is selected by the user. The present time value is suspended while either control signal 60 or gate signal 62 is applied to multi-memory function programmable timer 10. Multi-memory function programmable timer 10 generates output signal 14 when the present time value reaches the preset time value. Output signal 14 is maintained for a duration selected by the user (the output time parameter) or until reset signal 34 or power down detector signal 26 is applied to multi-memory function programmable timer 10.

In output mode D, the power on delay without reset mode, the present time value is maintained, i.e. not reset, when power to the timer is resumed after any interruption. Timing begins when power is supplied to multi-memory function programmable timer 10 and, as timing continues, the present time value is increased or decreased depending on whether the up mode of counting or the down mode of counting is selected by the user. The present time value is suspended while either control signal 60 or gate signal is applied to multi-memory function programmable timer 10. Multi-memory function programmable timer 10 generates output signal 14 when the present time value reaches the preset time value. Output signal 14 is maintained for a duration selected by the user (the output time parameter) or until reset signal 34 is applied to multi-memory function programmable timer 10. However, if power down detector signal 26 is applied to multi-memory function programmable timer 10, the present time value will be maintained until power is restored to multi-memory function programmable timer 10, at which time the timing operation will resume.

In output mode E, the repeat off/on cycle with power on reset mode, the present time value is reset to the user defined set point value in the down mode of counting or to zero in the up mode of counting by multi-memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. If the user selects the hold setting for value of the output time parameter, output signal 14 cycles between "off" (no output signal generated by multi-memory function programmable timer 10) for the preset time and "on" (output signal generated by multi-memory function programmable timer 10) for the preset time, until either reset signal 34 or power down detector signal 26 is applied to multi-memory function programmable timer 10. If the user selects a specific time duration for the value of the output time parameter, such as 1 second, output signal 14 is initially "off" for the preset time, and then cycles between "on" for the output time chosen, i.e. 1 second, and "off" for a time period equal to the difference between the output time chosen and the preset time. If the difference is equal to or less than zero, output signal 14 cycles between "off" for the preset time and "on" for the preset time, until either reset signal 34 or power down detector signal 26 is applied to multi-memory function programmable timer 10.

In output mode F, the repeat off/on cycle with power on without reset mode, the present time value is maintained, i.e. not reset, when power to the timer is resumed after any interruption. Timing begins at the leading edge of control signal 60 and, as timing continues, the present time value is increased or decreased depending on whether the up mode of counting or the down mode of counting is selected by the user. The "off/on" cycle of output signal 14 begins at the leading edge of control signal 60. The present time value is suspended while gate signal 62 is applied to multi-memory function programmable timer 10. If the user selects the hold setting for the value of the output time parameter, output signal 14 cycles between "off" (no output signal generated by multi-memory function programmable timer 10) for the preset time and "on" (output signal generated by multi-memory function programmable timer 10) for the preset time, until reset signal 34 is applied to multi-memory function programmable timer 10. If the user selects a specific time duration for the value of the output time parameter, such as 1 second, output signal 14 is initially "off" for the preset time, and then cycles between "on" for the output time chosen and "off" for a time period equal to the difference between the output time chosen and the preset time. If the difference is equal to or less than zero, output signal 14 cycles between "off" for the preset time and "on" for the preset time, until reset signal 34. If power down detector signal 26 is applied to multi-memory function programmable timer 10 at any time, the present time value is maintained until power is restored to multi-memory function programmable timer 10, at which time the timing operation will resume.

In output mode G, the signal off delay mode, the present time value is reset to the user defined set point value in the down mode of counting or to zero in the up mode of counting by multi-memory function programmable timer 10 when power to the timer is resumed after any interruption. Multi-memory function programmable timer 10 begins to generate output signal 14 at the leading edge of control signal 60. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. Multi-memory function programmable timer 10 discontinues output signal 14 when the present time value reaches the preset time or when reset signal 34 or power down detector signal 26 is applied to multi-memory function programmable timer 10. The output time parameter is not programmable by the user.

In output mode H, the interval on mode, the present time value is reset to the user defined set point value in the down mode of counting or to zero in the up mode of counting by multi-memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. Multi-memory function programmable timer 10 generates output signal 14 during the timing operation. Multi-memory function programmable timer 10 discontinues output signal 14 when the present time value reaches the preset time or when reset signal 34 or power down detector signal 26 is applied to multi-memory function programmable timer 10. The output time parameter is not programmable by the user.

In output mode L, the total on delay mode, the present time value is maintained, i.e. not reset, when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. Multi-memory function programmable timer 10 begins to generate output signal 14 when the present time value reaches the preset time value. Multi-memory function programmable timer 10 maintains output signal 14 until either reset signal 34 or power down detector signal 26 is applied to multi-memory function programmable timer 10. The output time parameter is not programmable by the user.

In output mode N, the signal on/off delay (on/on) mode, the present time value is reset to the user defined set point value in the down mode of counting or to zero in the up mode of counting by multi-memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. The present time value resets and timing resumes at the leading edge and the trailing edge of control signal 60 or when reset signal 34 is applied to multi-memory function programmable timer 10 while control signal 60 is applied to multi-memory function programmable timer 10. Multi-memory function programmable timer 10 generates output signal 14 during the timing operation until the present time value reaches the preset time, at which time multi-memory function programmable timer 10 discontinues output signal 14. Multi-memory function programmable timer 10 resumes generating output signal 14 when timing resumes. The output timer parameter is not programmable by the user.

In output mode O, the signal on/off delay (off/on) mode, the present time value is reset to the user defined set point value in the down mode of counting or to zero in the up mode of counting by multi-memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. The present time value resets and timing resumes at the leading edge and the trailing edge of control signal 60 or when reset signal 34 is applied to multi-memory function programmable timer 10 while control signal 60 is applied to multi-memory function programmable timer 10. When timing resumes at the leading edge of control signal 60, multi-memory function programmable timer 10 generates output signal 14 if the present time value reaches the preset time value. Multi-memory function programmable timer 10 maintains output signal 14 until control signal 60 is discontinued or until reset signal 34 or power down detector signal 26 is applied to multi-memory function programmable timer 10. Multi-memory function programmable timer 10 resumes generating output signal 14 when timing resumes. When timing resumes at the trailing edge of control signal 60, multi-memory function programmable timer 10 begins to generate output signal 14. Multi-memory function programmable timer 10 maintains output signal 14 until the present time value reaches the preset time or until reset signal 34 or power down detector signal 26 is applied to multi-memory function programmable timer 10. The output time parameter is not programmable by the user.

In output mode P, the signal flicker mode, the present time value is reset to the user defined set point value in the down mode of counting or to zero in the up mode of counting by multi-memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. Once timing begins, multi-memory function programmable timer 10 cycles output signal 14 between "on" for the preset time and "off" for the preset time. Receipt of reset signal 34 or power down detector signal 26 discontinues both timing and generation of output signal 14. When timing resumes, the output signal cycle begins in the "off" position. The output time parameter is not programmable by the user.

In output mode S, the one-shot cycle (off/on) mode, the present time value is reset to the user defined set point value in the down mode of counting or to zero in the up mode of counting by multi-memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. Once timing begins, multi-memory function programmable timer 10 cycles output signal 14 between "off" for the preset time and "on" for the preset time. Receipt of reset signal 34 or power down detector signal 26 discontinues both timing and generation of output signal 14. The output time parameter is not programmable by the user.

In output mode T, the signal one-shot off delay, the present time value is reset to the user defined set point value in the down mode of counting or to zero in the up mode of counting by multi-memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. Multi-memory function programmable timer 10 generates output signal 14 when timing begins and maintains output signal 14 for the preset time. The "on" period of output signal 14 starts over upon receipt of a subsequent control signal 60. Reset signal 34 or power down detector signal 26 cause multi-memory function programmable timer 10 to discontinue output signal 14 until a control signal is applied to resume timing. The output time parameter is not programmable by the user.

In output mode U, the repeat on/off cycle with power on reset mode, the present time value is reset to the user defined set point value in the down mode of counting or to zero in the up mode of counting by memory function programmable timer 10 when power to the timer is resumed after any interruption. Timing begins at the leading edge of control signal 60 and, as timing continues, the present time value is increased or decreased depending on whether the up mode of counting or the down mode of counting is selected by the user. The present time value is suspended while gate signal 62 is applied to multi-memory function programmable timer 10. If the user selects the hold setting for value of the output time parameter, output signal 14 cycles between "on" for the preset time and "off" for the preset time, until reset signal 34 is applied to multi-memory function programmable timer 10. If the user selects a specific time duration for the value of the output time parameter, such as 1 second, output signal 14 is initially "on" for the preset time, and will then cycle between "off" for the output time chosen and "on" for a time period of the difference between the output time chosen and the preset time. If the difference is equal to or less than zero, output signal 14 cycles between "on" for the preset time and "off" for the preset time, until reset signal 34 is applied to multi-memory function programmable timer 10. If power down detector signal 26 is applied to multi-memory function programmable timer 10 at any time, the present time value is maintained until power is restored to multi-memory function programmable timer 10, at which time, timing resumes.

In output mode Y, the one-shot on delay mode, the present time value is reset to the user defined set point value in the down mode of counting or to zero in the up mode of counting by multi-memory function programmable timer 10 when power to the timer is resumed after any interruption. Timing begins when power is supplied to multi-memory function programmable timer 10 and, as timing continues, the present time value is increased or decreased depending on whether the up mode of counting or the down mode of counting is selected by the user. The present time value is suspended while gate signal 62 is applied to multi-memory function programmable timer 10. The present time value is reset at the leading edge of control signal 60, the trailing edge of reset signal 34, or when power is first supplied to multi-memory function programmable timer 10. When the present time value reaches the preset time value, multi-memory function programmable timer 10 generates output signal 14. Multi-memory function programmable timer 10 maintains output signal 14 until a subsequent control signal 60 is received, or the reset or power down detector signal is received by multi-memory function programmable timer 10. The output time parameter is not programmable by the user.

Once the up/down mode parameter is selected, multi-memory function programmable timer 10 prompts the user, via display means 18, to select the set point from which timing is to begin or end depending on whether the up or down mode was chosen. If the user selects the up mode, the user selects a set point value at which timing will end. For example, the user may select a time value, such as one minute, for the set point. If the user selected a time range of one minute units, output mode A, and up mode timing, the present time value would initially be set at zero and timing would begin at the leading edge of control signal 60 counting from zero to the set point, one minute. Conversely, if the user selected a time range of one minute units, output mode A, and down mode timing, the present time value would be initially set at the set point, one minute, and timing would begin on the leading edge of the control signal, timing from one minute to zero.

The key protect parameter permits the user to enable or disable the key protect feature of multi-memory function programmable timer 10. When the key protect feature is enabled, receipt of key protect signal 28 by multi-memory function programmable timer 10 causes microprocessor 50 to ignore input from keypad 20 thereby preventing a user from using the keypad to program or operate multi-memory function programmable timer 10. When the protect feature is disabled, multi-memory function programmable timer 10 ignores key protect signal 28.

The memory storage position parameter allows the user to select one of the memory storage locations (M0–M5) of plurality of memory storage means 56 for storing a programmed timer configuration. For example, User A stores an A timer configuration in memory storage location M1 to perform task A. The A configuration includes a preset time value of 9999 seconds, up mode of timing, output mode E, output time duration of 0.5 seconds, and key protection for storage in memory storage location M1. User B stores a B configuration in memory storage location M2 to perform task B. The B configuration includes a preset time value of 5678 hours, down mode of timing, output mode F, output time duration of twenty (20) seconds and no key protection for storage in memory storage location M2. Users may continue to program timer configurations for storage in memory storage locations M3–M5. If a particular user wishes to operate any of the five stored timer configurations, he or she can use the retrieve memory function mode, described below, to recall and use the particular timer configuration.

User programming of the preset time value is accomplished in the set value mode. As indicated above, the user may select a preset time value for use in one of the programmed timer configurations. Pressing set key 82 while in the run mode initiates the set value mode programming process. In the set value mode, set key 82 is pressed to move between the digits of the preset time value and write key 80 is pressed to sequentially scan through the permissible values (zero (0) through nine (9)) of the selected digit. Once the desired value is displayed, pressing set key 82 causes the displayed value for the selected digit to be assigned to the preset time value, and immediately causes the next digit to be selected for the purpose of assigning a value thereto. After a complete set of values is chosen for the digits of the preset time value, pressing reset key 86 returns multi-memory function programmable timer 10 to the run mode. It should be noted that pressing reset key 86 at any time while in the set value mode returns multi-memory function programmable timer 10 to the run mode. The preset time value may be changed at any time, including while multi-memory function programmable timer 10 is timing.

User selection of a programmed timer configuration from a memory storage location of plurality of memory storage means 56 is accomplished in the retrieve memory function mode. Pressing memory key 84 in the run mode initiates the memory retrieval process. In the retrieve memory function mode, memory key 84 is pressed to sequentially scan between the six memory storage locations, M0–M5. Pressing reset key 86 selects the chosen memory storage location and returns multi-memory function programmable timer 10 to the run mode.

Figure 5:
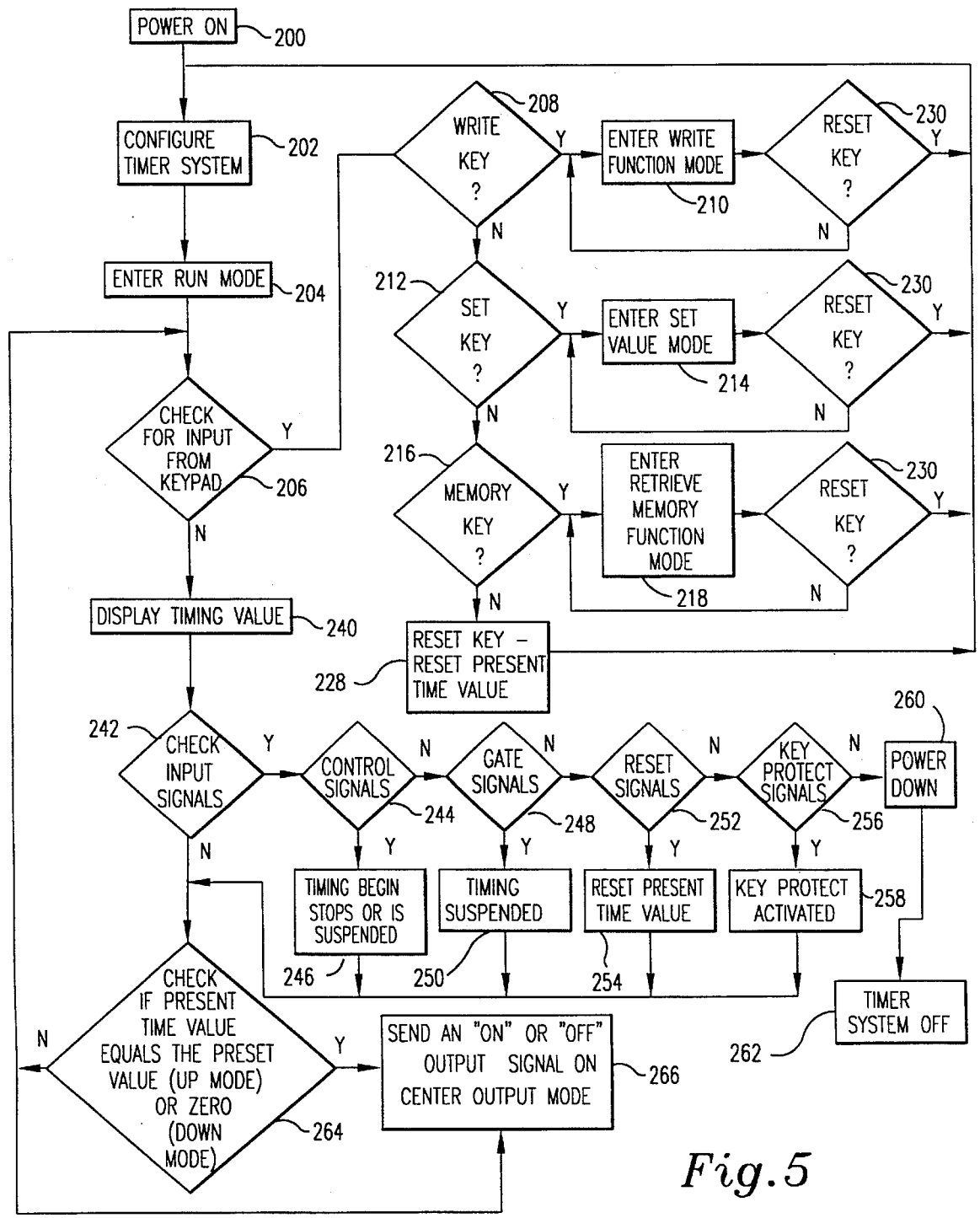
FIG. 5 is a generalized flowchart of the operation of the first embodiment of the present invention, the multi-memory function programmable timer.

FIG. 5 is a generalized flowchart showing the operation of multi-memory function programmable timer 10. After power on, block 200, multi-memory function timer 10 is configured according to the current timer configuration stored in memory storage location M0, block 202. Flow continues to block 204 and multi-memory function timer 10 enters the run mode.

Multi-memory function programmable timer 10 performs a test at decision block 206 to determine whether or not the user has pressed a key from keypad 20. If at decision block 206 it is determined that a key has been pressed, multi-memory function programmable timer 10 performs a second test at decision block 208 to determine if the write key has been pressed. If write key 80 was selected, multi-memory function programmable timer 10 enters the write function mode, block 210. If write key 208 was not selected, a third test is performed at decision block 212 to determine whether or not the user has pressed set key 82. If set key 82 was pressed, multi-memory function programmable timer 10 enters the set value mode, block 214. If set key 82 was not selected, a fourth test is performed at decision block 216 to determine whether or not the user has pressed memory key 84. If memory key 84 was selected, multi-memory function programmable timer 10 enters the retrieve memory mode, block 218. If memory key 84 was not selected, flow continues to block 228, where the present time value is reset in response to the selection of reset key 86.

While in the write function mode, block 210, the set value mode, block 214, and the retrieve memory function mode, block 218, a test is performed at decision block 230 to determine whether or not reset key 86 had been pressed. If reset key 86 is pressed, the present time value is reset and flow continues back to configure timer system, block 202.

If at decision block 206 it is determined that there is no input from keypad 20, display means 18 begins to display the present time value, block 240. A test is performed at decision block 242 to determine whether any input signals are high. If at decision block 242 it is determined that an input signal is high, a second test is performed at decision block 244 to determine if control signal 60 is high. If the control signal 60 is high, timing begins, timing stops or timing is suspended depending on the timer configuration selected, block 246. Flow then continues to decision block 264.

If control signal 60 is low, a third test is performed at decision block 248 to determine whether or not gate signal 62 is high. If gate signal 62 is high, timing is suspended, block 250, and flow continues to decision block 264.

If gate signal 62 is low, a fourth test is performed at decision block 252 to determine whether or not reset signal 86 is high. If reset signal 86 is high, the present time value is reset, block 254, and flow continues to decision block 264.

If reset signal 86 is low, a fifth test is performed at decision block 256 to determine whether or not key protect signal 28 is high. If key protect signal 28 is high, and if the key protect feature was selected by the user, further input from the keypad is ignored, block 258. Flow then continues to decision block 264. If key protect signal is low, power down detector signal 26 must be high, block 260, and multi-memory function programmable timer 10 is turned off.

At decision block 264, a test is performed to determine whether or not the present time value equals the preset time value, if the up mode of counting was selected, or whether or not the present time value equals zero, if the down mode of counting was selected. If the present time value equals the preset time value or zero, multi-memory function programmable timer 10 generates output signal 14 in accordance with the output mode selected, block 266. Flow then returns to decision block 206. If the present time value does not equal the preset time value or zero, flow returns to decision block 206.

It is to be understood that multi-memory function programmable timer 10 is not limited to the permissible values and the timer function parameters described above. Those skilled in the art will appreciate that other permissible values and timer function parameters may be incorporated into the present invention to define many different timer configurations for use with multi-memory function programmable timer 10.

COUNTER EMBODIMENT

Figure 3:
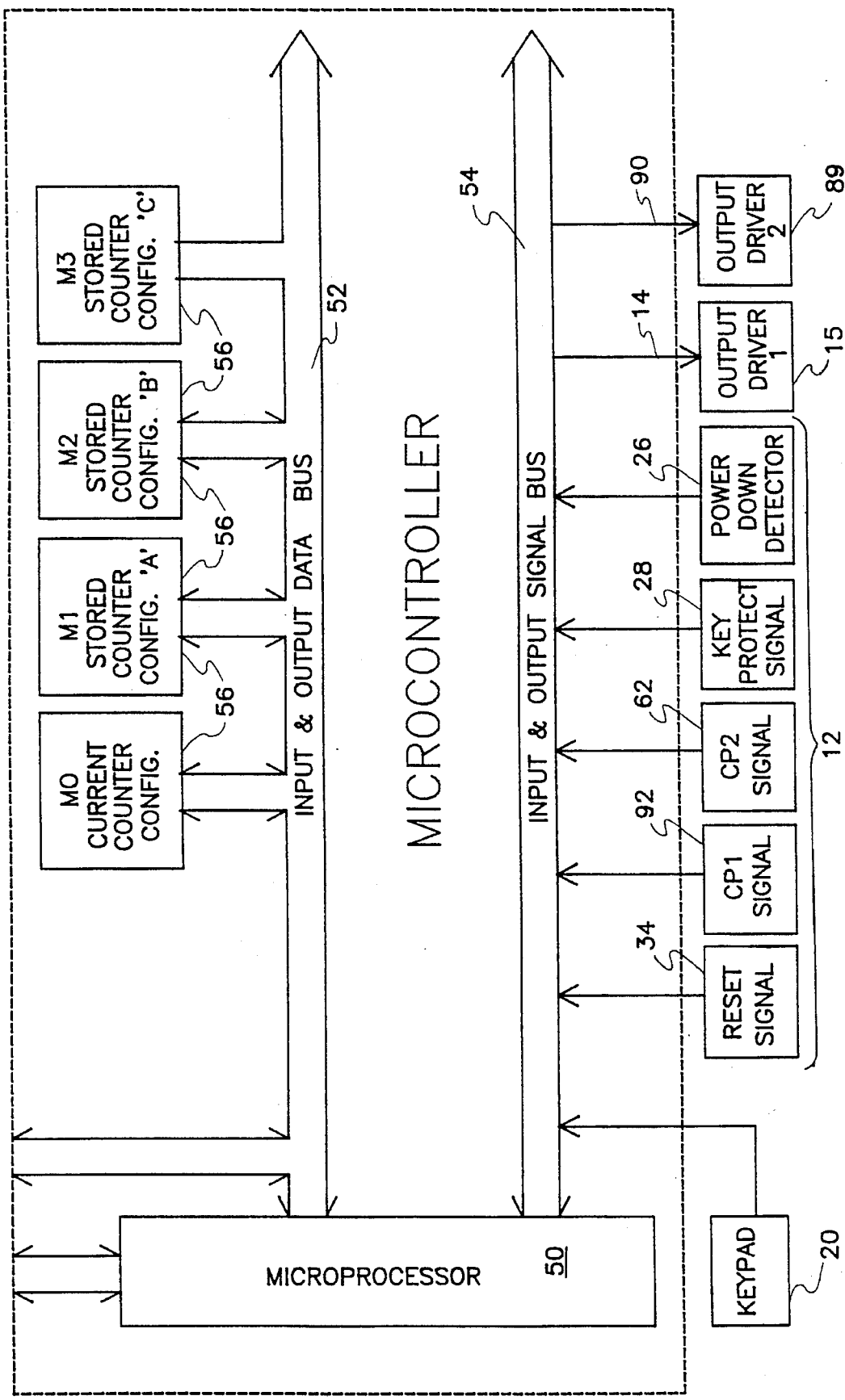
FIG. 3 is a block diagram of a second embodiment of the present invention, a multi-memory function programmable counter, showing the relationship between the major components of the microcontroller and the input and output signals of the multi-memory function programmable counter.

Referring to FIG. 3, the features of microcontroller 16 when used in a multi-memory function programmable counter in accordance with the present invention is shown. Microcontroller 16 includes microprocessor 50, input and output data bus 52, input and output control signal bus 54, and plurality of memory storage means 56.

Microprocessor 50 includes primary memory storage means (not shown) for storing a plurality of sets of permissible values for a plurality of sets of counter function parameters and for storing a multi-function programmable counter system operating program. In the present embodiment, the primary storage means is in the form of non-volatile flash programmable erasable random only memory (PEROM). Preferably, primary memory storage means is in the form of a non-volatile memory storage device. Alternatively, the primary memory storage means can be in the form of a volatile memory storage device or in the form of any other well known memory storage device, such as read only memory (ROM), programmable read only memory (PROM), erasable programmable read only memory (EPROM), dynamic random access memory (DRAM), and static random access memory (SRAM).

Plurality of memory storage means 56 includes four memory storage locations, M0–M3, for storing a plurality of counter configurations. Each counter configuration is defined by a set of counter function parameters and a preset count value chosen by the user, as described in more detail below. Plurality of memory storage means 56 is preferably a volatile memory storage memory device, but can be a non-volatile memory storage device. In the present embodiment, plurality of memory storage means 56 is in the form of RAM. Alternatively, plurality of memory storage means 56 may be in the form of DRAM or SRAM. Plurality of memory storage means 56 communicates with microprocessor 50 via input and output data bus 52.

The configuration of multi-memory function counter 10 can be chosen by the user by selecting a counter configuration from one of the memory storage locations of plurality of memory storage means 56. The system operating program stored in microprocessor 50 manages the entire function of multi-memory function counter 10, including programming of the function parameters and the preset count values and performing the counting operation in accordance with the selected counter configuration. A present count value is maintained internally to microcontroller 16 in one of its internal memory locations, such as a register.

Plurality of inputs 12, output driver 15, and keypad 20 communicate with microprocessor 50 via input and output control signal bus 54. Additionally, the present embodiment includes a second output driver 89 and a second output signal 90 which communicates with microprocessor 50 via input and output control signal bus 54. First input signal 30 is a CP1 signal 92 for the signal of when counting by multi-memory function programmable counter 10 is to begin, for suspending counting, and for reversing counting direction, depending on which input mode is selected by the user. Second input signal 32 is a CP2 signal 62 for temporarily suspending counting functions by multi-memory function programmable counter 10, for changing the counting direction and for signaling when counting is to begin, depending on which input mode is selected by the user. Reset signal 34 clears the present counting value within multi-memory function programmable counter 10. Power down detector signal 26 signals microprocessor 50 that power to multi-memory function programmable counter 10 has been interrupted. Key protect signal 28 signals microprocessor 50 to ignore input from keypad 20 thereby preventing a user from using the keypad to program or operate multi-memory function programmable counter 10. Plurality of input signals 12 can be in the form of an external mechanical signal, such as from a toggle switch, or an external electric signal, such as a clock pulse.

In operation, the primary memory storage means is preprogrammed with a set of permissible values for each of the counter function parameters selectable by the user to define a particular counter configuration. The counter function parameters include an input mode, an output mode, a first output time, a second output time, an input pulse speed rate, a key protect mode, and a memory storage position. One counter configuration is defined by the selection of one permissible value for each one of the counter function parameters and a preset count value. As a result, numerous counter configurations may be selected or programmed by the user for use with multi-memory function programmable counter 10.

When multi-memory function programmable counter 10 is turned on, i.e. power is supplied to the counter from power supply 23, the counter is in the run mode. In the run mode, the counter will begin to operate, i.e. start counting, upon receipt of CP1 signal 92 from a predetermined source. During the counting operation, the present count value is displayed by multi-memory function programmable counter 10 on display means 18.

User programming of a counter configuration is accomplished in the write function mode. Pressing write key 80 while in the run mode initiates the programming process. Further pressing of write key 80 in the write function mode allows the user to select between the counter function parameters. Pressing set key 82 in the write function mode allows the user to sequentially scan through the permissible values stored in the primary memory means, for the currently selected counter function parameter. Once the desired value is displayed, pressing write key 80 causes the displayed permissible value for the selected counter function parameter to be assigned to the selected counter function parameter, and immediately causes the next counter function parameter to be selected for the purpose of assigning a value thereto. After a complete set of counter function parameter values is selected by the user, pressing reset key 86 returns multi-memory function programmable counter 10 to the run mode. At this time, the set of selected counter function parameter values is stored in memory storage location M0 as the current counter configuration or is stored in one of the memory storage locations, M1–M3, that was selected as part of the set of selected counter function parameter values. It should be noted that pressing reset key 86 at any time while in the write function mode returns multi-memory function programmable counter 10 to the run mode.

The input mode parameter allows the user to select from seven input modes U1, U2, UD-A, UD-C, D1, D2, UD-B. The present count value is a function of CP1 signal 92 and CP2 signal 62, the function being defined by the particular input mode selected. The present count value is then used in conjunction with reset signal 34 to determine first output signal 14 and second output signal 90 in accordance with the particular output mode selected. The possible output modes are described below.

In input mode U1, the first up counting mode, counting begins on the leading edge of CP1 signal 92 and the present count value is incremented on the leading edge of each subsequent CP1 signal. Counting is inhibited for the duration of CP2 signal 62.

In input mode U2, the second up counting mode, counting begins on the trailing edge of CP2 signal 62 and the present count value is incremented on the trailing edge of each subsequent CP2 signal. Counting occurs only for the duration of CP1 signal 92. Absence of CP1 signal 92 inhibits counting.

In input mode UD-A, the reversible direction counting mode, counting begins on the leading edge of CP1 signal 92 and the present count value is incremented on the leading edge of each subsequent CP1 signal. The counting direction is reversed for the duration of CP2 signal 62 and the present count value is decremented on the leading edge of each subsequent CP1 signal. The count direction is subsequently reversed, incrementing the present count value, when CP2 signal 62 is discontinued.

In input mode UD-C, the reversible phase counting mode, counting begins on the trailing edge of CP2 signal 62 when the leading edge of CP2 signal 62 lags behind the leading edge of CP1 signal 92. The present count value is incremented on the trailing edge of each subsequent CP2 signal. When a leading edge of CP1 signal 92 lags the leading edge of CP2 signal 62, the counting direction is reversed and the present count value is decremented on the leading edge of each subsequent CP2 signal. The count direction may subsequently be reversed by alternating CP2 signal 62 and CP1 signal 92 in the above described manner.

In input mode D1, the first down counting mode, counting begins on the leading edge of CP1 signal 92 and the present count value is decremented on the leading edge of each subsequent CP1 signal. Counting is inhibited for the duration of CP2 signal 62.

In input mode D2, the second down counting mode, counting begins on the trailing edge of CP2 signal 62 and the present count value is decremented on the trailing edge of each subsequent CP2 signal. Counting occurs only for the duration of CP1 signal 92. Absence of CP1 signal 92 inhibits counting.

In input mode UD-B, the reversible individuality counting mode, counting begins on the leading edge of CP1 signal 92 and the present count value is incremented on the leading edge of each subsequent CP1 signal. The counting direction is reversed on the leading edge of CP2 signal 62 and the present count value is decremented on the leading edge of each subsequent CP2 signal. When the leading edge of CP2 signal 62 and the leading edge of CP1 signal 92 are simultaneous, the present count value is held constant.

The first output time parameter and the second output time parameter allow the user to select the duration of first output signal 14 and second output signal 90, respectively, to be generated by the counter. For example, in the present embodiment, the user can select between output time periods of 20 milliseconds, 60 milliseconds, 100 milliseconds, 200 milliseconds, 500 milliseconds, 1000 milliseconds, 3000 milliseconds, or 5000 milliseconds, for each one of first output signal 14 and second output signal 90. Additionally, the user may chose the hold setting, in which first output signal 14 or second output signal 90 is maintained by multi-memory function programmable counter 10 until another signal, such as reset signal 34 or power down detector signal 26, is applied to multi-memory function programmable counter 10.

The output mode parameter allows the user to select between eight different output modes (modes A–H), each corresponding to different output signals generated during the counting operation by the counter as a function of the present count value, a first preset count value, a second preset count value, and reset signal 34. The first preset count value and the second preset count value are selected by the user, as described below. FIGS. 7A–7H are flowcharts showing the operation of multi-memory function programmable counter 10 in accordance with a particularly selected output mode and in accordance with input mode U1.

In output mode A, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Multi-memory function programmable counter 10 maintains second output signal 90 and stops counting, holding the present count value at the second preset count value, until reset signal 34 is applied to multi-memory function programmable counter 10. While counting is stopped, the second preset count value is displayed by displayed means 18.

Figure 7A:
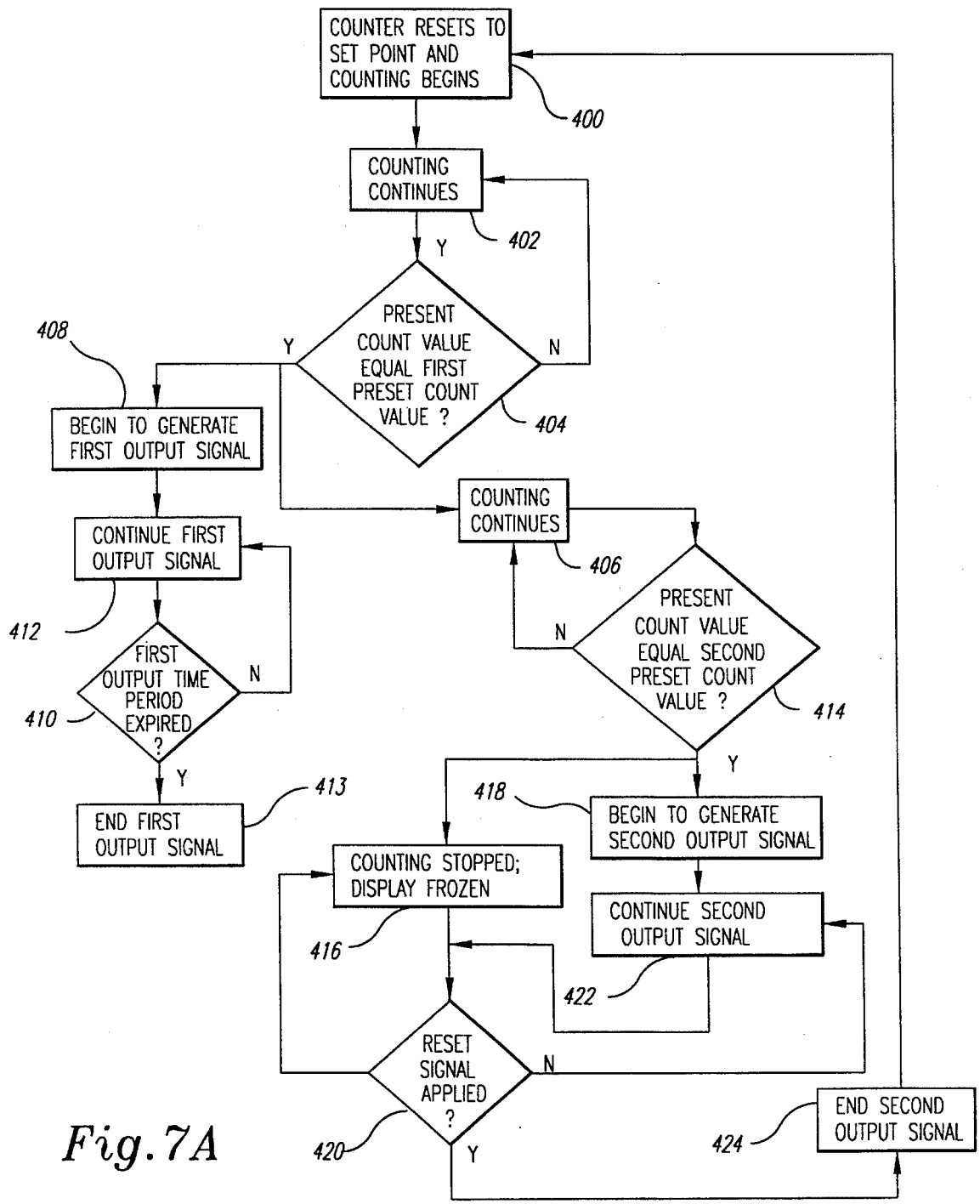
FIGS. 7a–7h are flowcharts of the operation of the second embodiment of the present invention, the multi-memory function programmable counter, showing the operation of the multi-memory function programmable counter in accordance with a selected output mode.

Referring to FIG. 7A, a flowchart of the operation of multi-memory function programmable counter 10 in accordance with output mode A is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, block 406. If it is determined at decision block 414 that the present count value equals the second preset count value, counting stops and the present count value (now equal to the second preset count value) is displayed on display means 18, at block 416. Additionally, multi-memory function programmable counter 10 begins to generate second output signal 90, at block 418. A test is performed at decision block 420 to determine if reset signal 34 has been received by multi-memory function programmable counter 10. If it is determined at decision block 420 that reset signal 34 has not been received by multi-memory function programmable counter 10, second output signal 90 is continued by multi-memory function programmable counter 10, block 422, and counting remains stopped, block 416. If it is determined at decision block 420 that reset signal 34 has been received by multi-memory function programmable counter 10, second output signal 90 is discontinued, block 424, and the present count value is reset to the set point and counting resumes, block 400.

In output mode B, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Multi-memory function programmable counter 10 maintains second output signal 90 and continues counting until reset signal 34 is applied to multi-memory function programmable counter 10.

Figure 7B:
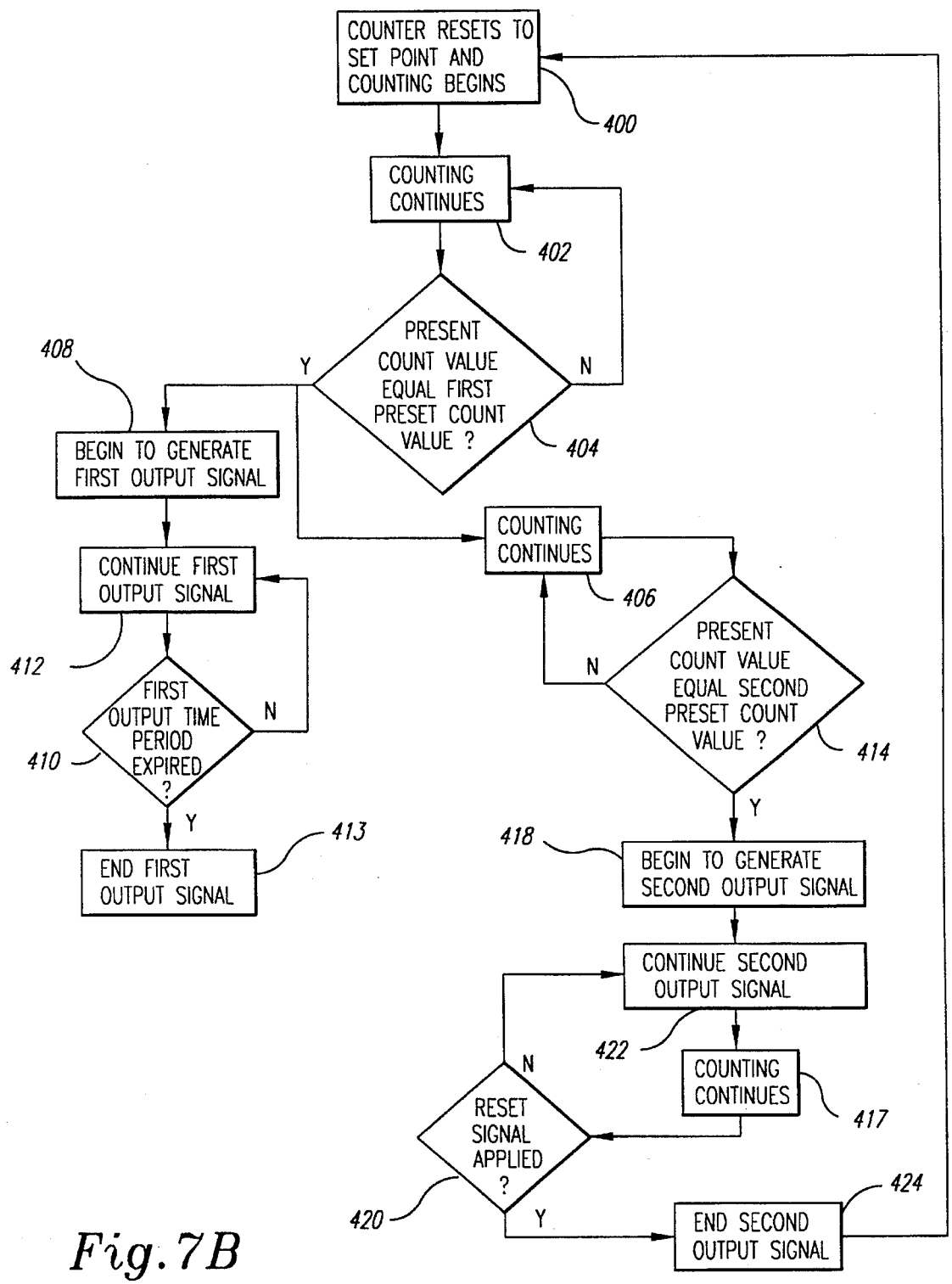

Referring to FIG. 7B, a flowchart of the operation of multi-memory function programmable counter 10 in accordance with output mode B is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, block 406. If it is determined at decision block 414 that the present count value equals the second preset count value, counting continues, block 417, and multi-memory function programmable counter 10 begins to generate second output signal 90, at block 418. A test is performed at decision block 420 to determine if reset signal 34 has been received by multi-memory function programmable counter 10. If it is determined at decision block 420 that reset signal 34 has not been received by multi-memory function programmable counter 10, second output signal 90 is continued by multi-memory function programmable counter 10, block 422, and counting continues, block 417. If it is determined at decision block 420 that reset signal 34 has been received by multi-memory function programmable counter 10, second output signal 90 is discontinued, block 424, and the present count value is reset to zero and counting resumes, block 400.

In output mode C, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Once the present count value reaches the second preset count value, multi-memory function programmable counter 10 resets and counting begins again (at zero). Reset signal 34 causes multi-memory function programmable counter 10 to discontinue first output signal 14 or second output signal 90 and reset the current counting value.

Figure 7C:
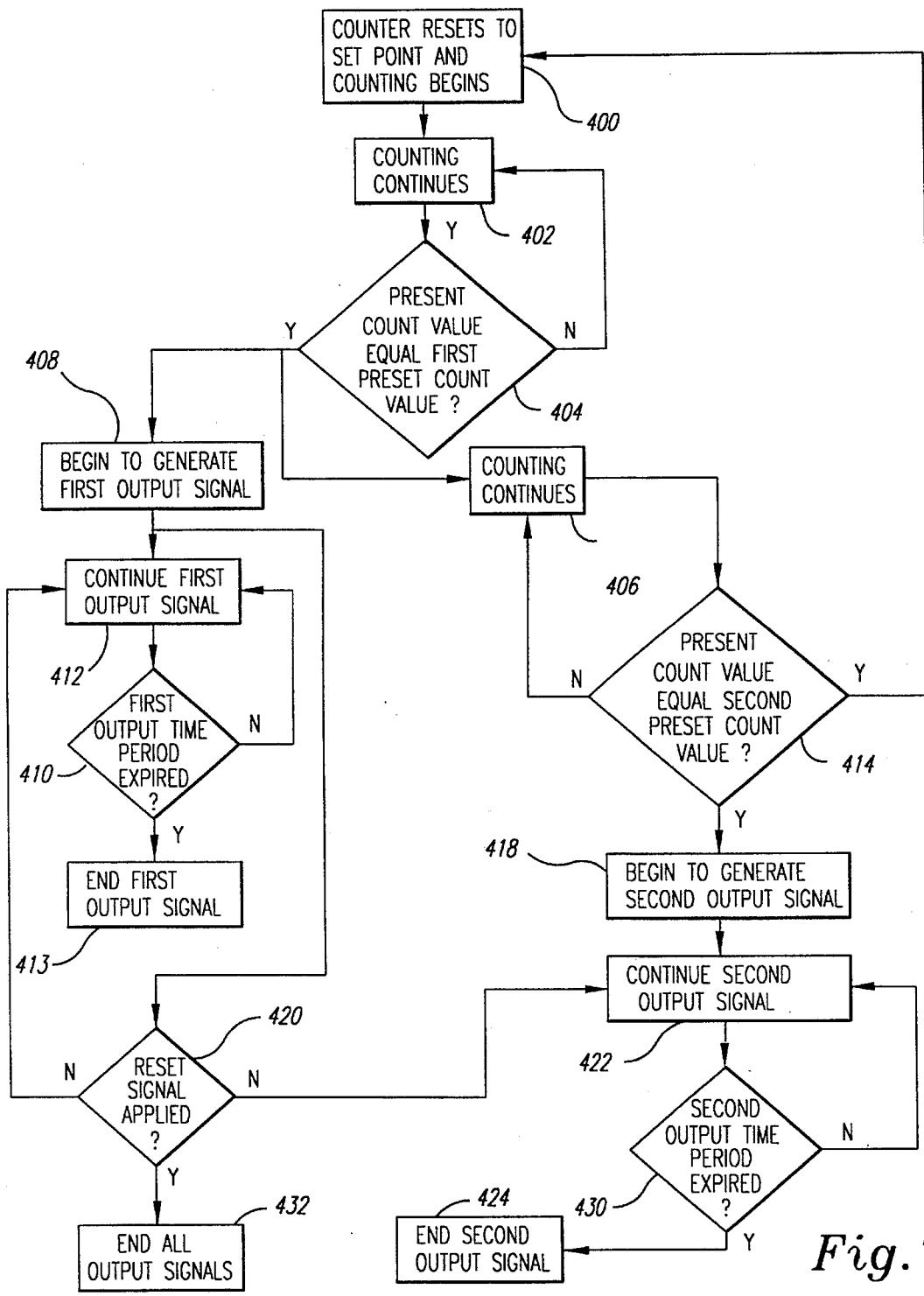

Referring to FIG. 7C, a flowchart of the operation of multi-memory function programmable counter 10 in accordance with output mode C is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, block 406. If it is determined at decision block 414 that the present count value equals the second preset count value, multi-memory function programmable counter 10 begins to generate second output signal 90, block 418. Additionally, the present count value is reset to zero and counting begins again, block 400.

A test is performed at decision block 430 to determine if the second output time period has expired. If at decision block 430 it is determined that the second output time has not expired, second output signal 90 is continued by multi-memory function programmable counter 10, block 422. If at decision block 430 it is determined that the second output time has expired, second output signal 90 is discontinued, block 424.

Once multi-memory function programmable counter 10 begins to generate first output signal 14 or second output signal 90, a test is perform at decision block 420 to determine if reset signal 34 has been received by multi-memory function programmable counter 10. If at decision block 420 it is determined that reset signal 420 has not been received, first output signal 14, block 412, and second output signal 90, block 422, are continued by multi-memory function programmable counter 10. If at decision block 420 it is determined that reset signal 420 has been received, first output signal 14 and second output signal 90 are discontinued, block 432.

In output mode D, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Once the present count value reaches the second preset count value and once the second output time period has expired, multi-memory function programmable counter 10 resets and counting begins again. Reset signal 34 causes multi-memory function programmable counter 10 to discontinue first output signal 14 or second output signal 90 and resets the current counting value.

Figure 7D:
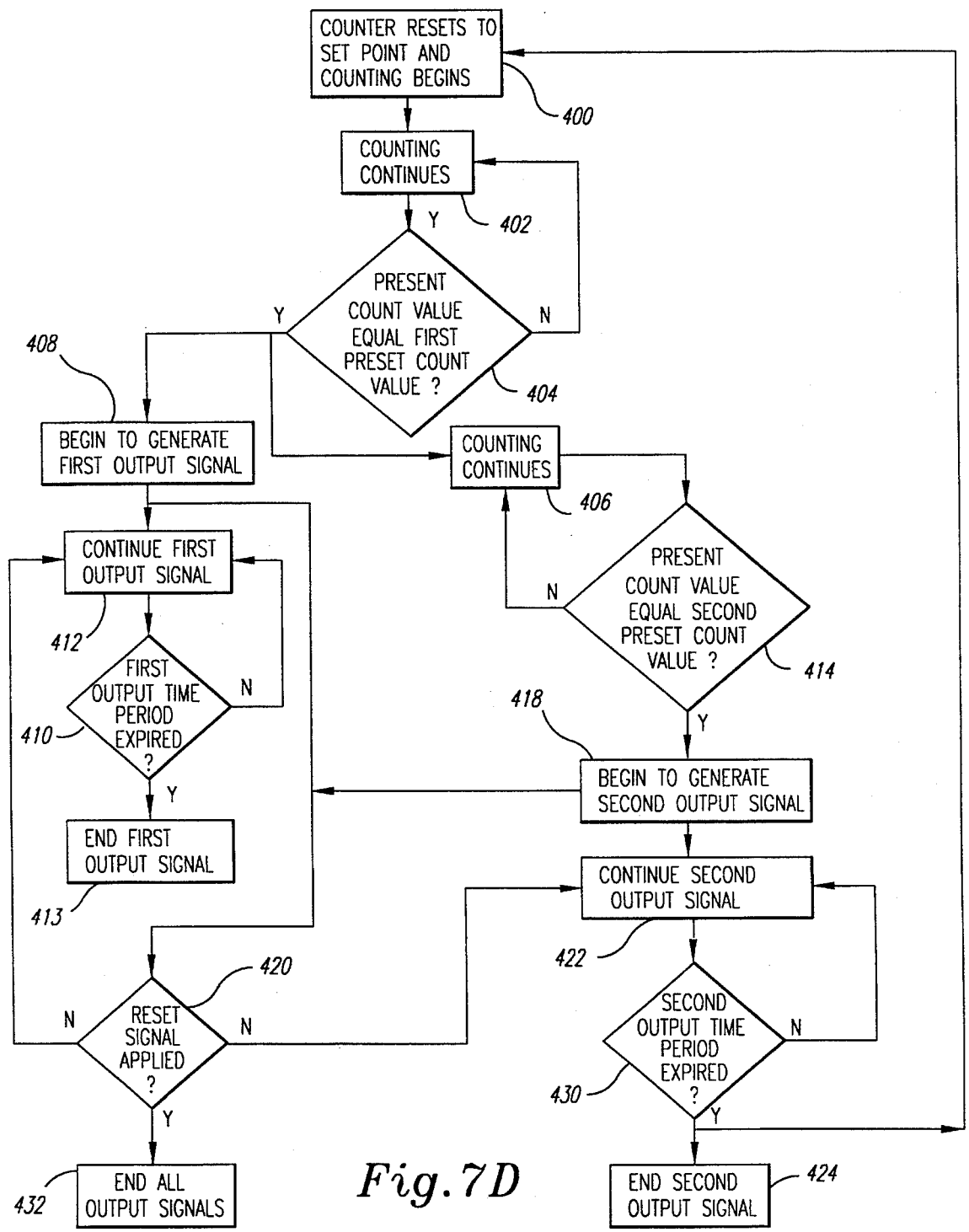

Referring to FIG. 7D, a flowchart of the operation of multi-memory function programmable counter 10 in accordance with output mode D is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, block 406. If it is determined at decision block 414 that the present count value equals the second preset count value, multi-memory function programmable counter 10 begins to generate second output signal 90, block 418.

A test is performed at decision block 430 to determine if the second output time period has expired. If at decision block 430 it is determined that the second output time has not expired, second output signal 90 is continued by multi-memory function programmable counter 10, block 422. If at decision block 430 it is determined that the second output time has expired, second output signal 90 is discontinued, block 424. Additionally, the present count value is reset to zero and counting begins again, block 400.

Once multi-memory function programmable counter 10 begins to generate first output signal 14 or second output signal 90, a test is perform at decision block 420 to determine if reset signal 34 has been received by multi-memory function programmable counter 10. If at decision block 420 it is determined that reset signal 420 has not been received, first output signal 14, block 412, and second output signal 90, block 422, are continued by multi-memory function programmable counter 10. If at decision block 420 it is determined that reset signal 420 has been received, first output signal 14 and second output signal 90 are discontinued, block 432.

In output mode E, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Once the present count value reaches the second preset count value, multi-memory function programmable counter 10 continues until reset signal 34 is applied to multi-memory function programmable counter 10. Once the second output time period expires, multi-memory function programmable counter 10 discontinues second output signal 90 and first output signal 14, even if the first output time period has not expired.

Figure 7E:
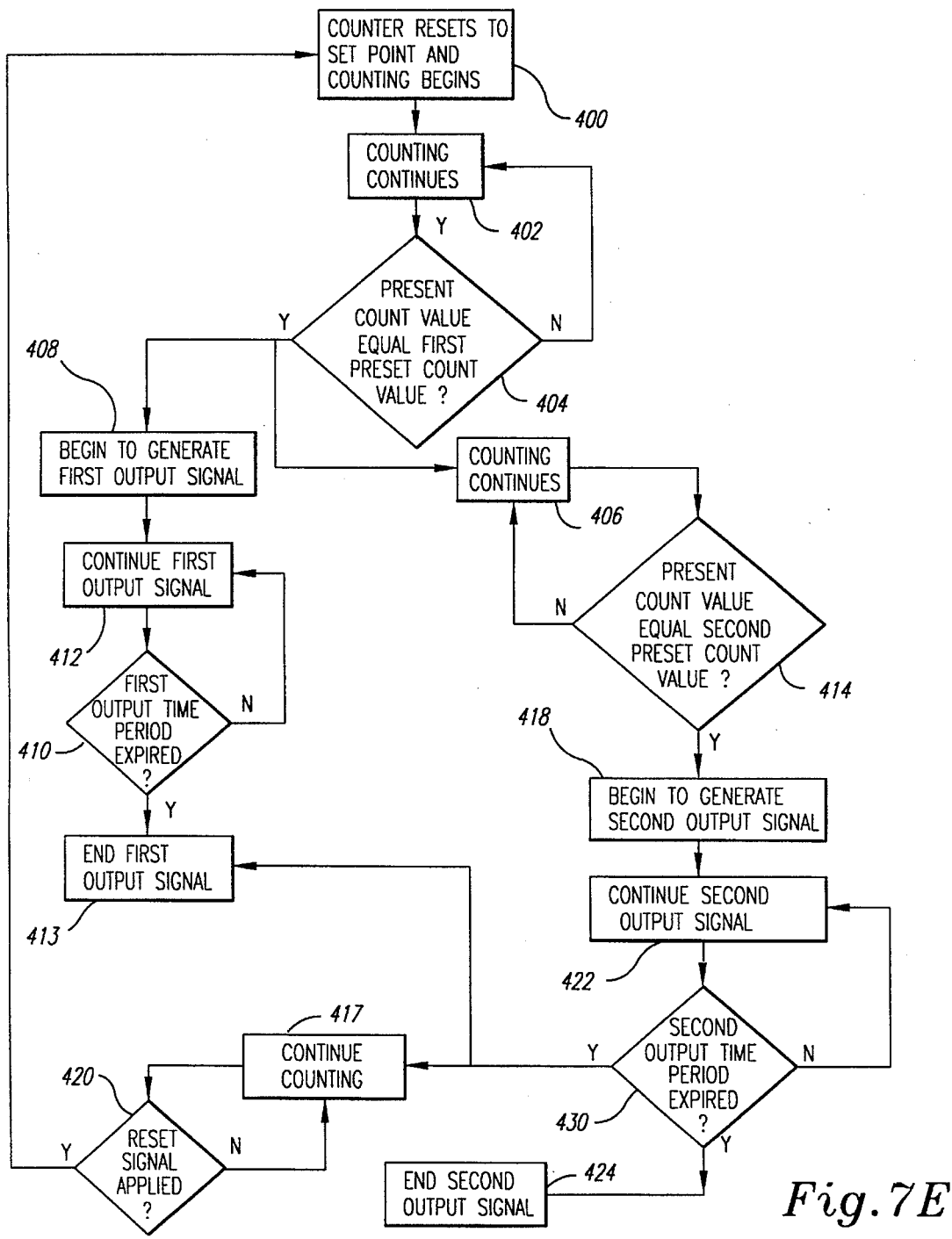

Referring to FIG. 7E, a flowchart of the operation of multi-memory function programmable counter 10 in accordance with output mode E is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, block 406. If it is determined at decision block 414 that the present count value equals the second preset count value, multi-memory function programmable counter 10 begins to generate second output signal 90, block 418.

A test is performed at decision block 430 to determine if the second output time period has expired. If at decision block 430 it is determined that the second output time has not expired, second output signal 90 is continued by multi-memory function programmable counter 10, block 422. If at decision block 430 it is determined that the second output time has expired, second output signal 90 is discontinued, block 424, and counting continues, block 417. Additionally, first output signal 412 is discontinued, even if first output time period has not expired, block 413.

Once multi-memory function programmable counter 10 begins counting, a test is perform at decision block 420 to determine if reset signal 34 has been received by multi-memory function programmable counter 10. If at decision block 420 it is determined that reset signal 420 has not been received, counting continues, block 417, until reset signal 34 is applied. If at decision block 420 it is determined that reset signal 420 has been received, the present count value is reset to zero and counting begins again, block 400.

In output mode F, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Once the present count value reaches the second preset count value, multi-memory function programmable counter 10 continues counting until the second output time period expires. Once the second output time period expires, multi-memory function programmable counter 10 resets and begins counting again. Reset signal 34 causes multi-memory function programmable counter 10 to discontinue first output signal 14 or second output signal 90 and resets the current counting value.

Figure 7F:
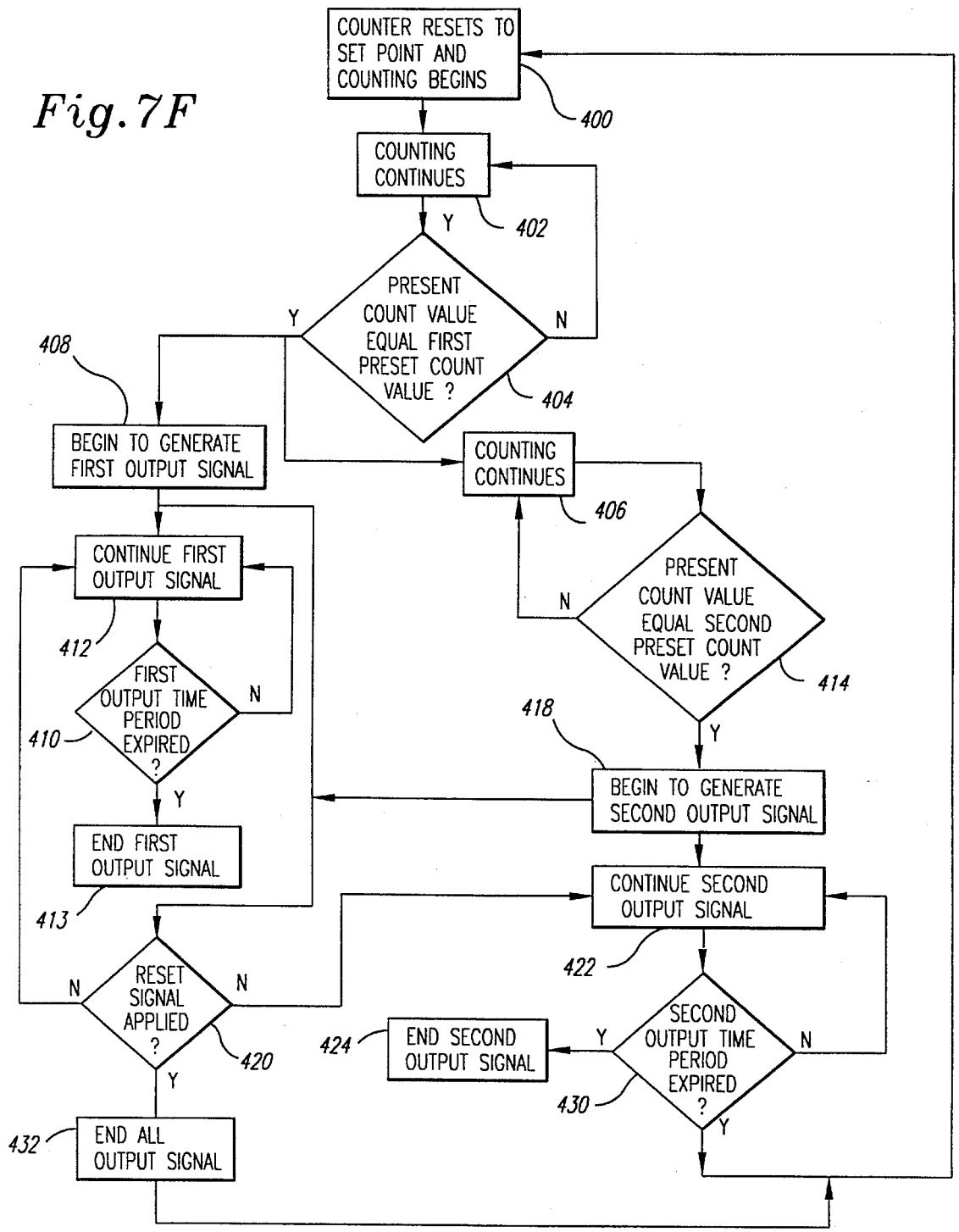

Referring to FIG. 7F, a flowchart of the operation of multi-memory function programmable counter 10 in accordance with output mode F is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, block 406. If it is determined at decision block 414 that the present count value equals the second preset count value, multi-memory function programmable counter 10 begins to generate second output signal 90, block 418.

A test is performed at decision block 430 to determine if the second output time period has expired. If at decision block 430 it is determined that the second output time has not expired, second output signal 90 is continued by multi-memory function programmable counter 10, block 422. If at decision block 430 it is determined that the second output time has expired, second output signal 90 is discontinued, block 424. Additionally, the present count value is reset to zero and counting begins again, block 400.

Once multi-memory function programmable counter 10 begins to generate first output signal 14 or second output signal 90, a test is perform at decision block 420 to determine if reset signal 34 has been received by multi-memory function programmable counter 10. If at decision block 420 it is determined that reset signal 420 has not been received, first output signal 14, block 412, and second output signal 90, block 422, are continued by multi-memory function programmable counter 10. If at decision block 420 it is determined that reset signal 420 has been received, first output signal 14 and second output signal 90 are discontinued, block 432. Additionally, the present count value is reset to zero and counting begins again, block 400.

In output mode G, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Once the present count value reaches the second preset count value, multi-memory function programmable counter 10 stops counting, holding the present count value at the second preset count value, until reset signal 34 is applied to multi-memory function programmable counter 10. While counting is stopped, the second preset count value is displayed by displayed means 18. First output signal 14 and second output signal 90 operate independently of each other.

Figure 7G:
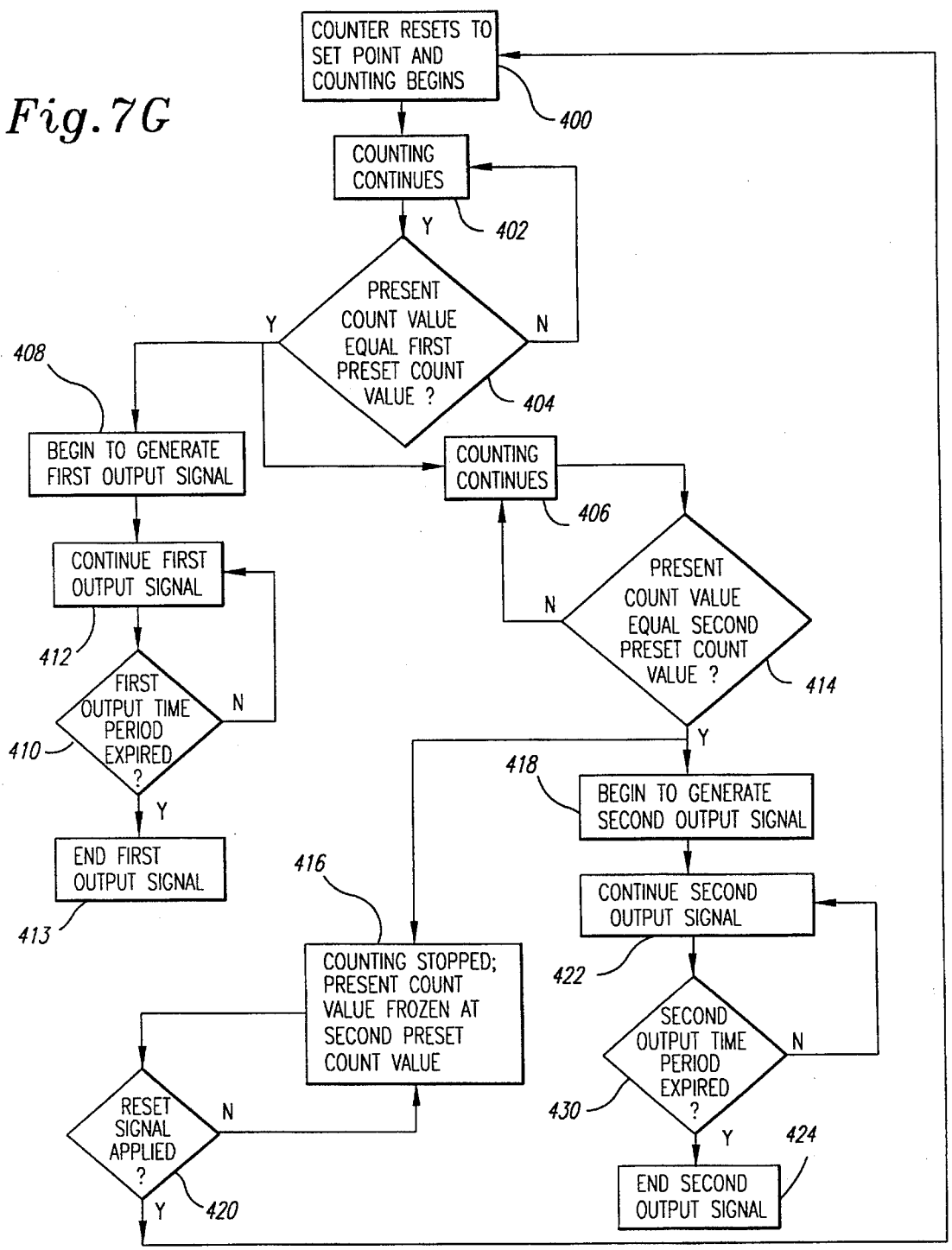

Referring to FIG. 7G, a flowchart of the operation of multi-memory function programmable counter 10 in accordance with output mode G is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, 406. If it is determined at decision block 414 that the present count value equals the second preset count value, multi-memory function programmable counter 10 begins to generate second output signal 90, block 418. Additionally, counting stops and the present count value (now equal to the second preset count value) is displayed on display means 18, at block 416. A test is performed at decision block 430 to determine if the second output time period has expired. If at decision block 430 it is determined that the second output time has not expired, second output signal 90 is continued by multi-memory function programmable counter 10, block 422. If at decision block 430 it is determined that the second output time has expired, second output signal 90 is discontinued, block 424.

A test is performed at decision block 420 to determine if reset signal 34 has been received by multi-memory function programmable counter 10. If it is determined at decision block 420 that reset signal 34 has not been received by multi-memory function programmable counter 10, counting remains stopped, block 416. If it is determined at decision block 420 that reset signal 34 has been received by multi-memory function programmable counter 10, the present count value is reset to zero and counting resumes, block 400.

In output mode H, multi-memory function programmable counter 10 generates first output signal 14 for the first output time period when the present count value reaches the first preset count value. Multi-memory function programmable counter 10 generates second output signal 90 for the second output time period when the present count value reaches the second preset count value. Once the present count value reaches the second preset count value, multi-memory function programmable counter 10 resets and begins counting again for the second output time period. Display means 18 remains frozen, however, displaying the second preset value until the second output time period expires. Reset signal 34 causes multi-memory function programmable counter 10 to discontinue first output signal 14 or second output signal 90 and resets the current counting value.

Figure 7H:
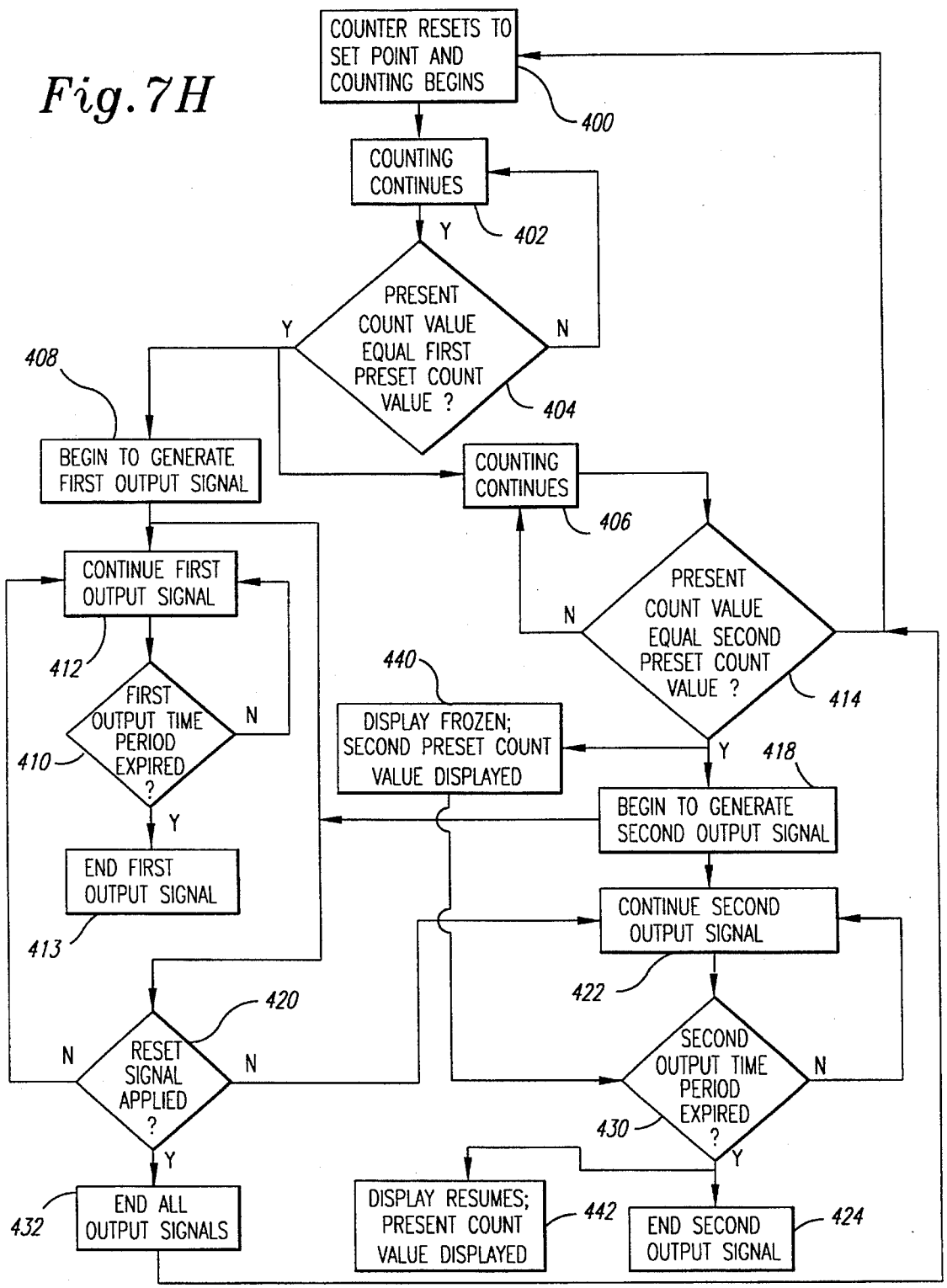

Referring to FIG. 7H, a flowchart of the operation of multi-memory function programmable counter 10 in accordance with output mode H is shown. Multi-memory function programmable counter 10 resets the present count value to zero and begins counting at block 400. A test is then performed at decision block 404 to determine whether the present count value is equal to the first preset count value. If at decision block 404 it is determined that the present count value is not equal to the first preset count value, counting continues at block 402 until the present count value equals the first preset count value.

If at decision block 404 it is determined that the present count value equals the first preset count value, counting continues at block 406 and multi-memory function programmable counter 10 begins to generate first output signal 14 at block 408. A test is then performed at decision block 410 to determine if the first output time period has expired. If at decision block 410 it is determined that the first output time period has not expired, multi-memory function programmable counter 10 continues to generate first output time signal 14, at block 412, until the first output time period has expired. If at decision block 410 it is determined that the first output time period has expired, multi-memory function programmable counter 10 discontinues first output time signal 14 at block 413.

As counting continues from block 406, a test is performed at decision block 414 to determine if the present count value is equal to the second preset count value. If it is determined at decision block 414 that the present count value is not equal to the second preset count value, counting continues until the present count value equals the second preset count value, block 406. If it is determined at decision block 414 that the present count value equals the second preset count value, multi-memory function programmable counter 10 begins to generate second output signal 90, block 418. Additionally, the second preset count value is again displayed on display means 18 while counting continues, block 440.

A test is performed at decision block 430 to determine if the second output time period has expired. If at decision block 430 it is determined that the second output time has not expired, second output signal 90 is continued by multi-memory function programmable counter 10, block 422. If at decision block 430 it is determined that the second output time has expired, second output signal 90 is discontinued, block 424. Additionally, the present count value is displayed again on display means 18.

Once multi-memory function programmable counter 10 begins counting, a test is perform at decision block 420 to determine if reset signal 34 has been received by multi-memory function programmable counter 10. If at decision block 420 it is determined that reset signal 420 has not been received, first output signal 14, block 412, and second output signal 90, block 422, are continued by multi-memory function programmable counter 10. If at decision block 420 it is determined that reset signal 420 has been received, first output signal 14 and second output signal 90 are discontinued, block 432. Additionally, the present count value is reset to zero and counting begins again, block 400.

The input pulse speed rate parameter allows the user to control the resolution of multi-memory function programmable counter 10 based on the speed rate of CP1 signal 92 and CP2 signal 62. The present embodiment provides three input pulse speed rates, 30 Hz, 1000 Hz, and 3000 Hz. The user selects the input pulse speed rate based on the frequency of CP1 signal 92 and CP2 signal 62. Preferably, the user selects an input pulse speed rate that is greater than the frequency of CP1 signal 92 and CP2 signal 62. For example, if the frequency of CP1 signal 92 and CP2 signal 62 is 50 Hz, the user could select the 1000 Hz or 3000 Hz for the value of the input pulse speed rate parameter. However, the 1000 Hz setting would be more preferable than the 3000 Hz setting, as the resolution of multi-memory function programmable counter 10 is greater at lower input pulse speed rate settings.

The key protect parameter permits the user to enable or disable the key protect feature of multi-memory function programmable counter 10. When the key protect feature is enabled, receipt of key protect signal 28 by multi-memory function programmable counter 10 prompts microprocessor 50 to ignore input from keypad 20 thereby preventing a user from using the keypad to program or operate multi-memory function programmable counter 10. When the key protect feature is disabled, multi-memory function programmable counter 10 ignores key protect signal 28.

The memory storage position parameter allows the user to select one of the memory storage locations (M0–M3) of plurality of memory storage means 56 for storing a programmed counter configuration. For example, User A stores configuration A in memory storage location M1 to perform task A. Configuration A includes preset count value 234567, input mode U1, output mode E, first output time duration of 0.5 seconds, second output time duration of 1 second, speed rate of 30 Hz, and the key protect feature. User B stores a configuration B in memory storage location M2 to perform task B. Configuration B includes preset count value 654321, input mode D1, output mode F, first output time duration of three (3) seconds, second output time duration of five (5) seconds, speed rate of 3000 Hz, and no key protect feature. A third counter configuration may be programmed for storage at memory storage location M3. If a particular user wishes to operate any of the three stored counter configurations, he or she can use the retrieve memory function mode, described below, to recall and use the particular counter configuration.

User programming of the first and second preset count value is accomplished in the set value mode. As indicated above, the user may select preset count values for triggering first output signal 14 and second output signal 90. In the set value mode, set key 82 is pressed to move between the digits of the preset count value and write key 80 is pressed to sequentially scan through the permissible values (zero (0) through nine (9)) of the selected digit. Once the desired value is displayed, pressing set key 82 causes the displayed value for the selected digit to be assigned to the first preset count value, and immediately causes the next digit to be selected for the purpose of assigning a value thereto. After a complete set of values is chosen for the digits of the first preset count value, the programming process continues in the same manner for the second preset count value. After a complete set of values is chosen for the digits of the second preset count value, pressing reset key 86 returns multi-memory function programmable count 10 to the run mode. It should be noted that pressing reset key 86 at any time while in the set value mode returns multi-memory function programmable counter 10 to the run mode. The preset count value may be changed at any time, including while multi-memory function programmable counter 10 is counting.

User selection of a programmed counter configuration from a memory storage location of plurality of memory storage means 56 is accomplished in the retrieve memory function mode. Pressing memory key 84 in the run mode initiates the memory retrieval process. In the retrieve memory function mode, the memory key is pressed to sequentially scan between the four memory storage locations, M0–M3. Pressing the reset key selects the chosen memory storage location and returns multi-memory function programmable counter 10 to the run mode.

Figure 6:
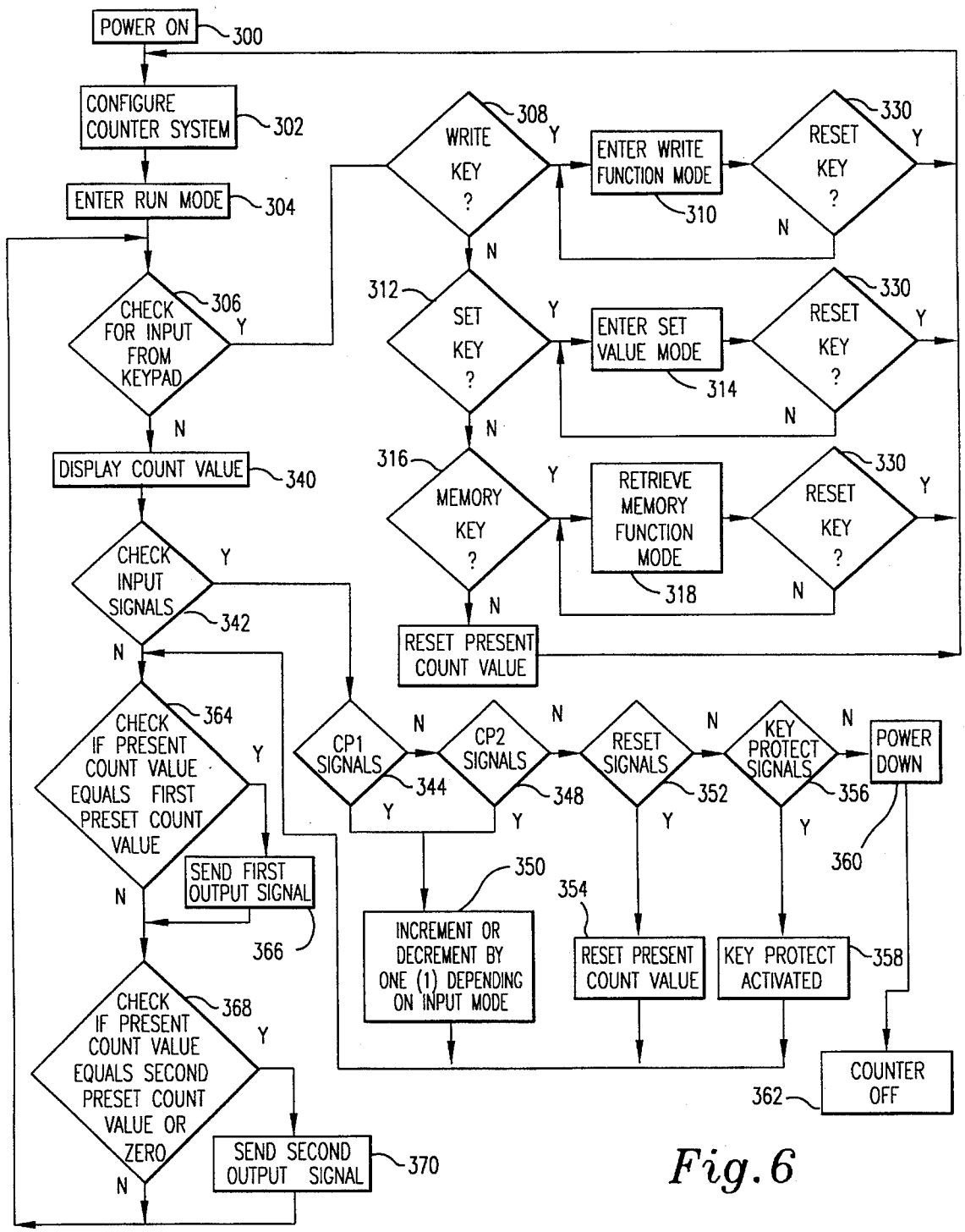
FIG. 6 is a generalized flowchart of the operation of the second embodiment of the present invention, the multi-memory function programmable counter.

FIG. 6 is a generalized flowchart showing the operation of multi-memory function programmable counter 10. After power on, block 300, multi-memory function counter 10 is configured according to the current counter configuration stored in memory storage location M0, block 302. Flow continues to block 304 and multi-memory function counter 10 enters the run mode.

Multi-memory function programmable counter 10 performs a test at decision block 306 to determine whether or not the user has pressed a key from keypad 20. If at decision block 306 it is determined that a key has been pressed, multi-memory function programmable counter 10 performs a second test at decision block 308 to determine if the write key has been pressed. If write key 80 was selected, multi-memory function programmable counter 10 enters the write function mode, block 310. If write key 308 was not selected, a third test is performed at decision block 312 to determine whether or not the user has pressed set key 82. If set key 82 was pressed, multi-memory function programmable counter 10 enters the set value mode, block 314. If set key 82 was not selected, a fourth test is performed at decision block 316 to determine whether or not the user has pressed memory key 84. If memory key 84 was selected, multi-memory function programmable counter 10 enters the retrieve memory mode, block 318. If memory key 84 was not selected, flow continues to block 328, where the present count value is reset in response to the selection of reset key 86.

While in the write function mode, block 310, the set value mode, block 314, and the retrieve memory function mode, block 318, a test is performed at decision block 330 to determine whether or not reset key 86 had been pressed. If reset key 86 is pressed, the present count value is reset and flow continues back to configure counter system, block 302.

If at decision block 306 it is determined that there is no input from keypad 20, display means 18 begins to display the present count value, block 340. A test is performed at decision block 342 to determine whether any input signals are high. If at decision block 342 it is determined that an input signal is high, a second test is performed at decision block 344 to determine if CP1 signal 92 is high. If the CP1 signal 92 is high, the present count value increments or decrements by one (1) depending on the input mode selected in the current configuration, block 350. Flow then continues to decision block 364.

If CP1 signal 92 is low, a third test is performed at decision block 348 to determine whether or not CP2 signal 62 is high. If CP2 signal 62 is high, the present count value increments or decrements by one (1) depending on the input mode selected in the current configuration, block 350, and flow continues to decision block 364.

If CP2 signal 62 is low, a fourth test is performed at decision block 352 to determine whether or not reset signal 86 is high. If reset signal 86 is high, the present count value is reset, block 354, and flow continues to decision block 364.

If reset signal 86 is low, a fifth test is performed at decision block 356 to determine whether or not key protect signal 28 is high. If key protect signal 28 is high, and if the key protect feature was selected by the user, further input from the keypad is ignored, block 358. Flow then continues to decision block 364. If key protect signal is low, power down detector signal 26 must be high, block 360, and multi-memory function programmable counter 10 is turned off.

At decision block 364, a test is performed to determine whether or not the present count value equals the first preset count value. If the present count value equals the preset count value, multi-memory function programmable counter 10 generates first output signal 14 in accordance with the output mode selected, block 366. Flow then continues to decision block 368. If the present count value does not equal the first preset count value, flow continues to decision block 368.

At decision block 368, a test is performed to determine whether or not the present count value equals the second preset count value, if the up mode of counting was selected, or whether or not the present count value equals zero, if the down mode of counting was selected. If the present count value equals the second preset count value or zero, multi-memory function programmable counter 10 generates second output signal 90 in accordance with the output mode selected, block 370. Flow then returns to decision block 306. If the present count value does not equal the second preset count value or zero, flow returns to decision block 306.

It is to be understood that multi-memory function programmable counter 10 is not limited to the permissible values and the counter function parameters described above. Those skilled in the art will appreciate that other permissible values and counter function parameters may be incorporated into the present invention to define many different counter configurations for use with multi-memory function programmable counter 10.

It is to be understood that the present invention is not limited to the embodiments described above, but encompasses any and all embodiments within the scope of the following claims.

We claim:

1. A timer for selectively assuming a plurality of timer configurations, said timer comprising:

a plurality of memory storage means corresponding in number to said plurality of timer configurations, each of said plurality of memory storage means having stored therein one of a plurality of sets of timer function parameters and a preset time value, each set of said plurality of sets of timer function parameters and said preset time value defining a respective one of said plurality of timer configurations;

a microprocessor including primary memory storage means for storing a plurality of sets of permissible values, each set of said plurality of sets of permissible values containing permissible values for a respective member of each set of said plurality of sets of timer function parameters, said microprocessor communicating with said plurality of memory storage means;

input means coupled to said microprocessor for allowing a user to select a value for each member of each set of said plurality of sets of timer function parameters and for said preset time value, said value for each member of each set of said plurality of sets of timer function parameters being selected from a respective one of said plurality of sets of permissible values; and selection means communicating with said microprocessor for allowing a user to select one of said plurality of timer configurations defined by a corresponding set of said plurality of sets of timer function parameters and said preset time value stored in a respective one of said plurality of memory storage means, said microprocessor controlling operation of said timer in accordance with said one of said plurality of timer configurations selected by the user, whereby said timer readily assumes any one of said plurality of timer configurations without the user having to reprogram said timer.

2. The timer according to claim 1, further including a display means for displaying operating and programming information.

3. The timer according to claim 1, wherein said plurality of memory storage means is a plurality of programmable non-volatile memory devices.

4. The timer according to claim 1, wherein said primary memory storage means is a programmable non-volatile memory device.

5. The timer according to claim 1, wherein said plurality of memory storage means is a plurality of programmable volatile memory devices.

6. The timer according to claim 1, wherein said primary memory storage means is a programmable volatile memory device.

7. The timer according to claim 1, wherein each of said plurality of sets of timer function parameters includes a time range, an up/down mode, an output mode, an output time, a key protect mode, and a memory storage position.

8. The timer according to claim 1, wherein said input means is a keypad.

9. The timer according to claim 8, wherein said keypad includes a write key, a set key, a memory retrieve key, and a reset key.

10. A counter for selectively assuming a plurality of counter configurations, said counter comprising:

a plurality of memory storage means corresponding in number to said plurality of counter configurations, each of said plurality of memory storage means having stored therein one of a plurality of sets of counter function parameters and a preset count value, each set of said plurality of sets of counter function parameters and said preset count value defining a respective one of said plurality of counter configurations;

a microprocessor including primary memory storage means for storing a plurality of sets of permissible values, each set of said plurality of sets of permissible values containing permissible values for a respective member of each set of said plurality of sets of counter function parameters, said microprocessor communicating with said plurality of memory storage means;

input means coupled to said microprocessor for allowing a user to select a value for each member of each set of said plurality of sets of counter function parameters and for said preset count value, said value for each member of each set of said plurality of sets of counter function parameters being selected from a respective one of said plurality of sets of permissible values; and selection means communicating with said microprocessor for allowing a user to select one of said plurality of counter configurations defined by a corresponding set of said plurality of sets of counter function parameters and said preset count value stored in a respective one of said plurality of memory storage means, said microprocessor controlling operation of said counter in accordance with said one of said plurality of counter configurations selected by the user, whereby said counter readily assumes any one of said plurality of counter configurations without the user having to reprogram said counter.

11. The counter according to claim 10, further including a display means for displaying operating and programming information.

12. The counter according to claim 10, wherein said plurality of memory storage means is a plurality of programmable non-volatile memory devices.

13. The counter according to claim 10, wherein said primary memory storage means is a programmable non-volatile memory device.

14. The counter according to claim 10, wherein said plurality of memory storage means is a plurality of programmable volatile memory devices.

15. The counter according to claim 10, wherein said primary memory storage means is a programmable volatile memory device.

16. The counter according to claim 10, wherein each of said plurality of sets of counter function parameters includes an input mode, an output mode, an output time, an input pulse speed rate, a key protect mode, and a memory storage position.

17. The counter according to claim 16, wherein said plurality of sets of function parameters further includes a second output time.

18. The counter according to claim 10, wherein said input means is a keypad.

19. The counter according to claim 18, wherein said keypad includes a write key, a set key, a memory retrieve key, and a reset key.

* * * * *